US007188117B2

(12) United States Patent
Farahat et al.

(10) Patent No.: US 7,188,117 B2
(45) Date of Patent: Mar. 6, 2007

(54) SYSTEMS AND METHODS FOR AUTHORITATIVENESS GRADING, ESTIMATION AND SORTING OF DOCUMENTS IN LARGE HETEROGENEOUS DOCUMENT COLLECTIONS

(75) Inventors: Ayman O. Farahat, San Francisco, CA (US); Francine R. Chen, Menlo Park, CA (US); Charles R. Mathis, Stanford, CA (US); Geoffrey D. Nunberg, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 409 days.

(21) Appl. No.: 10/232,709

(22) Filed: Sep. 3, 2002

(65) Prior Publication Data

US 2003/0225750 A1 Dec. 4, 2003

Related U.S. Application Data

(60) Provisional application No. 60/380,876, filed on May 17, 2002.

(51) Int. Cl.
*G06F 17/00* (2006.01)
(52) U.S. Cl. .............................. 707/101; 707/3; 707/10; 707/102; 707/103 Y; 707/104.1
(58) Field of Classification Search ................ 707/1–5, 707/104.1, 6, 10, 101, 102, 103 Y; 412/19
See application file for complete search history.

(56) References Cited

U.S. PATENT DOCUMENTS 5,278,980 A 1/1994 Pedersen et al.
5,442,778 A 8/1995 Pedersen et al.
5,687,364 A * 11/1997 Saund et al. .................. 704/5
5,884,305 A 3/1999 Kleinberg et al.
6,112,202 A 8/2000 Kleinberg
6,112,203 A 8/2000 Bharat et al.
6,178,417 B1 1/2001 Syeda-Mahmood
6,263,351 B1 7/2001 Wolfe
6,269,368 B1 * 7/2001 Diamond ....................... 707/6

(Continued)

OTHER PUBLICATIONS

Dwork et al. "Rank Aggregation Methods for the Web" http://www10.org/cdrom/papers/577/ pp. 1-30. May 2001. ACM Press.*

(Continued)

*Primary Examiner*—Thuy N. Pardo
(74) *Attorney, Agent, or Firm*—Oliff & Berridge, PLC; Eugene Palazzo

(57) ABSTRACT

Systems and methods for determining the authoritativeness of a document based on textual, non-topical cues. The authoritativeness of a document is determined by evaluating a set of document content features contained within each document to determine a set of document content feature values, processing the set of document content feature values through a trained document textual authority model, and determining a textual authoritativeness value and/or textual authority class for each document evaluated using the predictive models included in the trained document textual authority model. Estimates of a document's textual authoritativeness value and/or textual authority class can be used to re-rank documents previously retrieved by a search, to expand and improve document query searches, to provide a more complete and robust determination of a document's authoritativeness, and to improve the aggregation of rank-ordered lists with numerically-ordered lists.

30 Claims, 13 Drawing Sheets

U.S. PATENT DOCUMENTS

| | | | |
|---|---|---|---|
| 6,285,999 | B1 | 9/2001 | Page |
| 6,334,131 | B2 | 12/2001 | Chakrabarti et al. |
| 6,336,112 | B2 | 1/2002 | Chakrabarti et al. |
| 6,389,436 | B1 * | 5/2002 | Chakrabarti et al. ........ 715/513 |
| 6,446,061 | B1 * | 9/2002 | Doerre et al. .................. 707/3 |
| 6,453,307 | B1 * | 9/2002 | Schapire et al. .............. 706/12 |
| 6,502,081 | B1 * | 12/2002 | Wiltshire et al. ............. 706/12 |
| 6,601,075 | B1 * | 7/2003 | Huang et al. ............ 707/104.1 |
| 6,606,620 | B1 * | 8/2003 | Sundaresan et al. ........... 707/3 |
| 6,751,600 | B1 * | 6/2004 | Wolin .......................... 706/12 |
| 6,862,710 | B1 * | 3/2005 | Marchisio ................ 715/501.1 |
| 6,910,843 | B2 * | 6/2005 | Saw et al. .................... 412/19 |
| 6,928,425 | B2 * | 8/2005 | Grefenstette et al. .......... 707/2 |
| 2001/0016846 | A1 | 8/2001 | Chakrabarti et al. |
| 2002/0138478 | A1 * | 9/2002 | Schwartz et al. .............. 707/3 |
| 2003/0061200 | A1 * | 3/2003 | Hubert et al. .................. 707/3 |
| 2003/0061201 | A1 * | 3/2003 | Grefenstette et al. .......... 707/3 |
| 2003/0101166 | A1 * | 5/2003 | Uchino et al. ................. 707/2 |
| 2003/0217047 | A1 * | 11/2003 | Marchisio ...................... 707/3 |
| 2005/0192957 | A1 * | 9/2005 | Newbold ....................... 707/5 |

OTHER PUBLICATIONS

Adam et al., "A Content-Based Authorization Model for Digital Libraries", IEEE, Mar./Apr. 2002, pp. 296-315.*

Freund et al., "Experiments with a New Boosting Algorithm", AT&T Research, http://www.research.att.com/orgs/ssr/people/(yoav,schapire)/, 1996.

Sean Slattery et al., "Discovering Test Set Regularities in Regulation Domains," Proceedings of the Seventeenth International Conference on Machine Learning (ICML 2000), Sep. 17, 2000, pp. 895-902.

Huan Chang et al., "Learning to Create Customized Authority Lists," Proceedings of the Seventeenth International Conference on Machine Learning (ICML 2000), Jun. 29, 2000, pp. 127-134.

David Cohn et al., "Learning to Probabilistically Identify Authoritative Documents," Proceedings of the Seventeenth International Conference on Machine Learning (ICML 2000), Jun. 29, 2000, pp. 167-174.

* cited by examiner

FIG. 5

| NUMBER | ATTRIBUTE | VALUES |
|---|---|---|
| 1 | REVIEW | REVIEWED (R), NOT REVIEWED (N) |
| 2 | AUTHOR'S BACKGROUND | PROFESSIONAL (P), GENERAL (G) |
| 3 | AUDIENCE | PROFESSIONAL (P), GENERAL (G) |
| 4 | AUTHOR'S AFFILIATION | PROFESSIONAL (P), MEDIA (M) COMMERCIAL (C), NONE (N) |

| ATTRIBUTE | | | | CLASS |
|---|---|---|---|---|
| 1 | 2 | 3 | 4 | |
| R | P | P | P | 1 |
| R | P | G | P | 2 |
| R | P | G | N | 3 |
| R | P,G | G | M | 4 |
| R | P,G | G | C | 5 |
| R,N | P,G | G | P,N,M | 6 |
| N | G | G | N | 7 |

FIG. 6

| URL | TEXTUAL AUTHORITATIVENESS VALUE USING LIN. REG. /350 | TEXTUAL AUTHORITATIVENESS VALUE USING ADABOOST /360 | TEXTUAL AUTHORITY CLASS (LIN. REG.) /430 | TEXTUAL AUTHORITY CLASS (ADABOOST) /430 |
|---|---|---|---|---|
| www.brainscience.brown.edu/news/postdocsalcohol.html | 2.36 | 2 | 2 | 2 |
| english.pravda.ru/fun/2001/08/23/13143.html | 2.52 | 3 | 2 or 3 | 3 |
| www.peele.net/lib/gambling.html | 2.66 | 3 | 3 | 3 |
| etoh.niaaa.nih.gov/ | 2.89 | 3 | 3 | 3 |
| www.addiction-ssa.org | 2.91 | 3 | 3 | 3 |
| www.macad.org | 2.93 | 3 | 3 | 3 |
| www.bma-wellness.com/Addiction/EtOHPsychobiology.htm | 2.94 | 3 | 3 | 3 |
| www.bfe.org/alco.htm | 2.96 | 3 | 3 | 3 |
| ssw.unc.edu/fcrp/Cspn/vol14_no4/gender_and_alcohol.htm | 3.03 | 3 | 3 | 3 |
| chemcases.com/alcohol/alc-11.htm | 3.07 | 3 | 3 | 3 |
| immuners.org/00/12step/recovery/treatment.htm | 3.10 | 3 | 3 | 3 |

*FIG. 13*

| Exemplary Sets of Document Content Feature Values | Exemplary Processes Used to Determine Sets of Document Content Features Values |
|---|---|
| 1.221 | Number of question marks and semicolons/ number of question marks in document |
| 0.27 | Number of noun phrases in document/ number of paragraphs in document |
| 0.156 | Number of particular style numerals/ number of total numerals present in document |
| 0.001 | Number of HTML features in document/ total number of characters in the document |

FIG. 14

SYSTEMS AND METHODS FOR AUTHORITATIVENESS GRADING, ESTIMATION AND SORTING OF DOCUMENTS IN LARGE HETEROGENEOUS DOCUMENT COLLECTIONS

This nonprovisional application claims the benefit of U.S. Provisional Application No. 60/380,876, filed May 17, 2002.

BACKGROUND OF THE INVENTION

1. Field of Invention

This invention generally relates to the field of information ranking and retrieval.

2. Description of Related Art

A notoriously difficult problem in using large heterogeneous document collections, such as the World Wide Web (the "Web"), is that it is not easy to recognize which documents, for example, which web pages and web documents, provide reliable authoritative information about a subject. The problem is particularly significant where it concerns "high-value" informational needs, such as retrieving medical information, where the cost of error may be high.

Authoritativeness of a web page or document is commonly measured based on social networks represented by the link structure of the Web. "The anatomy of a large-scale hypertextual (web) search engine," by S. Brin et al., $7^{th}$ International World Wide Web Conference, 1998, and "Authoritative sources in a hyperlinked environment," by J. Kleinberg, Proc. of the $9^{th}$ ACM-SIAM Symposium on Discrete Algorithms, 1998, each of which is incorporated herein by reference in its entirety, respectively discuss the algorithm used by the PageRan® search engine implemented by the search site Google® and HITS® algorithm.

SUMMARY OF THE INVENTION

Exemplary algorithms, such as HITS® and the algorithm used by PageRan® search engine, are used to determine the authoritativeness of a web page based on its link structure. However, these techniques do not consider the content of the documents, even though the content is often a highly useful indicator of the authoritativeness of a document, and the authoritativeness of the content is not derivable from link structure alone.

The concept of "authoritativeness" has two interpretations. The first is grounded in social networks and is in essence a graph-theoretical notion. As an example of social authority, when a newspaper says, "An authoritative source announced that the President would veto the bill," people generally interpret "authoritative" to mean that the source was relatively close to the people who have social authority over the matter in question. The person in this case, presumably, would be someone socially close to the President or his advisors. This is the concept of authoritativeness that is implicit in the use of tools like citation indexes, where an "authoritative" source is one that is relatively central in the network of citations in a given scientific or scholarly literature. It is also the concept that is operationalized in the various link-analysis approaches to implementing search engines like Google®, where "authoritative" pages are generally those that are linked to by a number of other pages, subject to various technical refinements.

This invention provides systems and methods that utilize a second concept of authoritativeness that is broadly defined as "textual." When someone says, for example, "Professor Jones has written an authoritative book on Roosevelt's foreign policy," it is not necessarily implied that Jones had any close relation to the people who had first-hand knowledge of the subject at hand, or for that matter that scholars or journalists are generally disposed to cite Jones' book, although that may very well be the case. Rather, what is meant is that the book is authoritative on internal grounds. These internal grounds can include that the book reads as if it is well-researched, that the book uses language in a skillful and appropriate way, that the book contains numerous references of the right sort, and the like.

In society at large, as evidenced on the Web, there is much more heterogeneity in knowledge and viewpoint. The fact that a text is widely referenced may not by itself assure that it is authoritative in the broader sense of the term. This point becomes particularly important when it comes to issues where there is a large amount of misinformation abroad, such as in obtaining medical information. For example, when the query "heterosexual transmission AIDS virus" was provided to the Google® search engine during a Web-based document search, the first 50 web pages/web links returned by the search engine contained a number of pages that most people would judge as authoritative, but also included some pages that the majority of health professionals would be unlikely to recommend, such as, for example a page about how federal AIDS policy is shaped by the "homosexual agenda," and a page that accuses the government of rewarding promiscuity by providing AIDS patients with housing assistance and other benefits. These pages came up well before other general-information pages from the HIV Insite project at the University of California at San Francisco or the Harvard AIDS Institute.

Misclassifications like those presented above are inevitable if only network authoritativeness is considered, inasmuch as purely quantitative analyses of linking patterns are often insufficient to distinguish concentrated, socially-marginal subcommunities from mainstream sites. Similarly, it often happens that a text that is authoritative on internal grounds occurs in a site that is not widely linked to, such as, for example, a government health institute report that someone has included on a Geocities site.

This invention provides systems and methods for estimating the authoritativeness of a document based on textual, non-topical cues.

This invention provides systems and methods for determining authoritativeness of a document that complement systems and methods employed for estimating authoritativeness of a document based on link structure.

This invention further provides systems and methods for combining textual estimates of document authoritativeness with link analysis.

This invention additionally provides systems and methods for applying textual authoritativeness estimates for re-ranking documents retrieved by search engines.

This invention additionally provides systems and methods for combining textual authoritativeness with social authority to provide a more complete and robust estimate of a document's authoritativeness.

This invention further provides systems and methods for applying textual authoritativeness estimates to expand and improve document query searches.

This invention further provides systems and methods for combining at least two sets of rank orderings, including at least one textual authoritativeness-based rank ordering and a link-based rank ordering to produce an aggregate set ordering that is closest in some distance to each of the least two sets of rank orderings.

In various exemplary embodiments, the systems and methods according to this invention determine a document's textual authority by evaluating a set of document content features contained within each document, processing the set of document content features through a trained document textual authority model to determine a set of document content feature values, and outputting a textual authoritativeness value and/or a textual authority class for each evaluated document.

In various exemplary embodiments, the systems and methods according to this invention select and evaluate document content features that represent both the linguistic and presentation content, such as, for example, colors and/or tables, of a particular web document or web page. Document content features considered by the systems and methods of this invention can include, for example, the use of particular characters in the plain text, such as, for example, question marks, semicolons; word-classes, such as, for example, words with learned prefixes like "pseudo-" or "hetero-" or learned suffixes like "-acious", "-metric", or "-icality"; various stylistic elements, such as, for example, the average length of the sentence, its standard deviation; HTML features, such as, for example, hyperlinks, tables, images, page color and the like.

In various exemplary embodiments, the systems and methods according to this invention process a set of document content features through a trained document textual authority model utilizing various processing circuits or routines to determine the textual authority of a document. The trained document textual authority model employed by the systems and methods of this invention is based on a set of documents that were manually labeled as to degree of textual authority, a set of document content features that were determined to be good predictors of the authoritativeness of a document, and a predictive model trained on the labeled document data.

In various exemplary embodiments, the systems and methods according to this invention output a textual authoritativeness value for each document that is determined using a document textual authority framework model included in the trained document textual authority model. The document textual authority framework model considers various document classification attributes such as the author's background, the targeted audience, the author's institutional affiliation, and whether the document has been reviewed or examined by others.

In various exemplary embodiments, the systems and methods according to this invention output an authority class for each document that is determined using a document authority class framework model included in the trained document textual authority model. The document authority class framework model considers various document classification attributes such as the author's background, the targeted audience, the author's institutional affiliation, and whether the document has been reviewed or examined by others.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods of this invention will be described in detail below, with reference to the following figures, in which:

FIG. 5 illustrates one exemplary embodiment of a set of attributes and values that are considered when classifying the authority of a document according to this invention;

FIG. 6 illustrates one exemplary embodiment of a class assigning framework for classifying the authority of a document based upon a set of attributes and values shown in the exemplary set in FIG. 5, according to this invention;

FIG. 13 illustrates one exemplary embodiment of textual authoritativeness values and textual authority classes determined for documents obtained from network environment of FIG. 1, according to this invention; and FIG. 14 illustrates one exemplary embodiment of processes for determining document content feature values for documents obtained from network environment of FIG. 1, according to this invention.

DETAILED DESCRIPTION OF EXEMPLARY EMBODIMENTS

Existing web-based document search techniques typically identify documents based primarily on the social authority of the document, such as, for example, the link structure of the document within the web environment. The search results obtained using existing techniques generally include many 'top-ranked' documents that are less relevant about the particular topic or area of interest chosen by a document searcher.

The systems and methods of this invention enable document collection search processes, such as web-based document search processes, to be improved using textual authority estimating models. Estimating the textual authority of a web page may be performed following a web-based document search operation using a web search engine.

Figure 1:
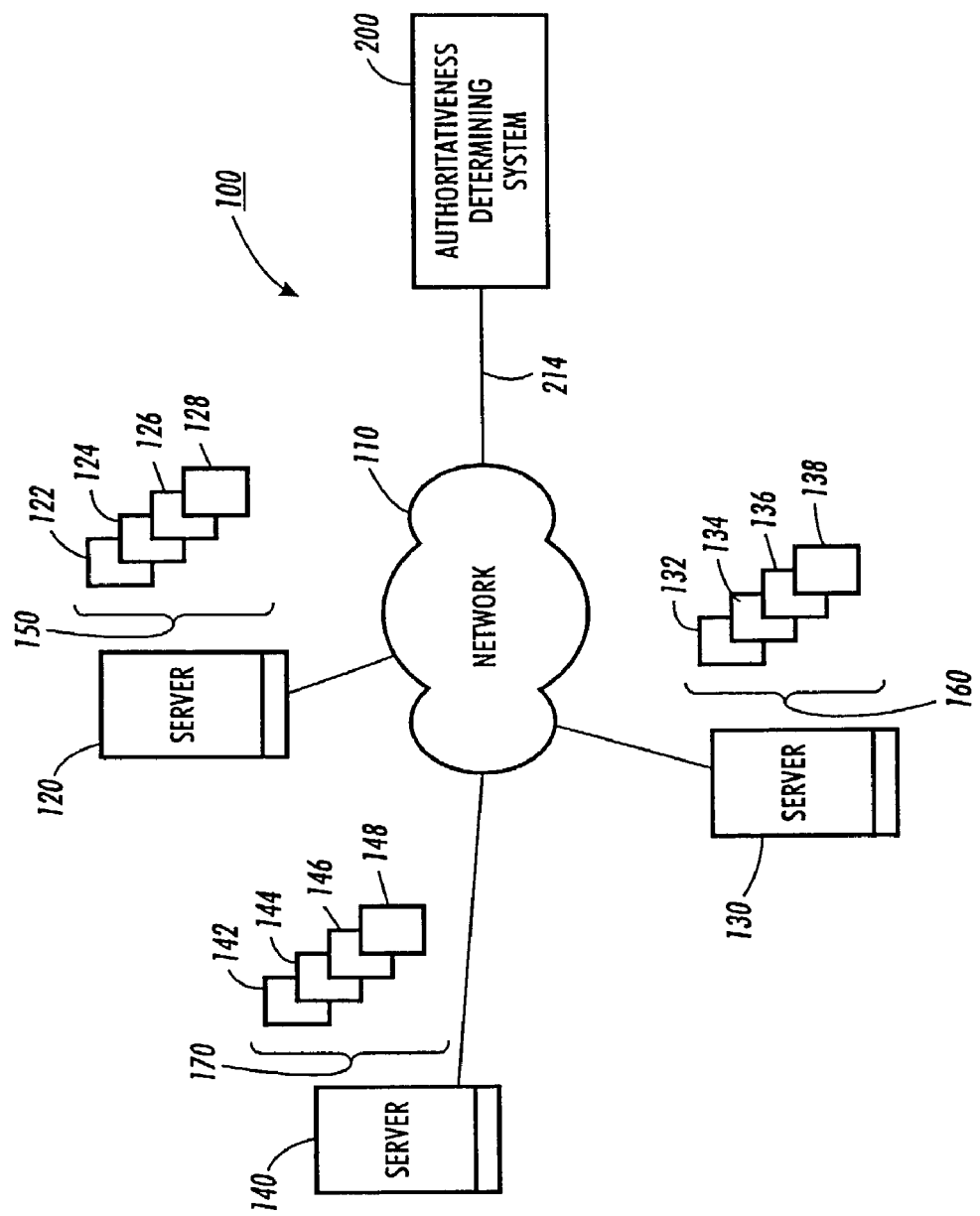
FIG. 1 illustrates a large heterogeneous network environment.

FIG. 1 shows one exemplary embodiment of a network environment 100 that the systems and methods of this invention are usable with. As shown in FIG. 1, a large heterogeneous network 110, such as the World Wide Web, typically includes millions of web sites, several of which are schematically represented as web site servers 120, 130 and 140. Additionally, each web site server 120, 130, 140 includes numerous web pages 122–128, 132–138 and 142–148, respectively, or other web-based information resources or documents suitable for being textually manipulated by the systems and methods of this invention. The web pages or documents 122–128, 132–138 and 142–148 are respectively arranged in a variety of web applications 150, 160 and 170, such as, for example, web site databases, or any other appropriate web application. A user, using a personal computer or other web-enabled device that is equipped with a suitable web browser and communications software, can access the network 110 over a communication link 214 and is able to access the documents available on the network 110. The network 110 includes, but is not limited to, for example, local area networks, wide area networks, storage area networks, intranets, extranets, the Internet, or any other type of distributed network, each of which can include wired and/or wireless portions.

The sheer volume of information available on the network 110 presents significant difficulties to a user in retrieving the most pertinent documents relevant to a particular area and or topic. In various exemplary embodiments, a network or web-connected authoritativeness determining system 200 according to this invention allows the web documents 122–128, 132–138 and 142–148 to be searched, graded, estimated and/or sorted.

Figure 2:
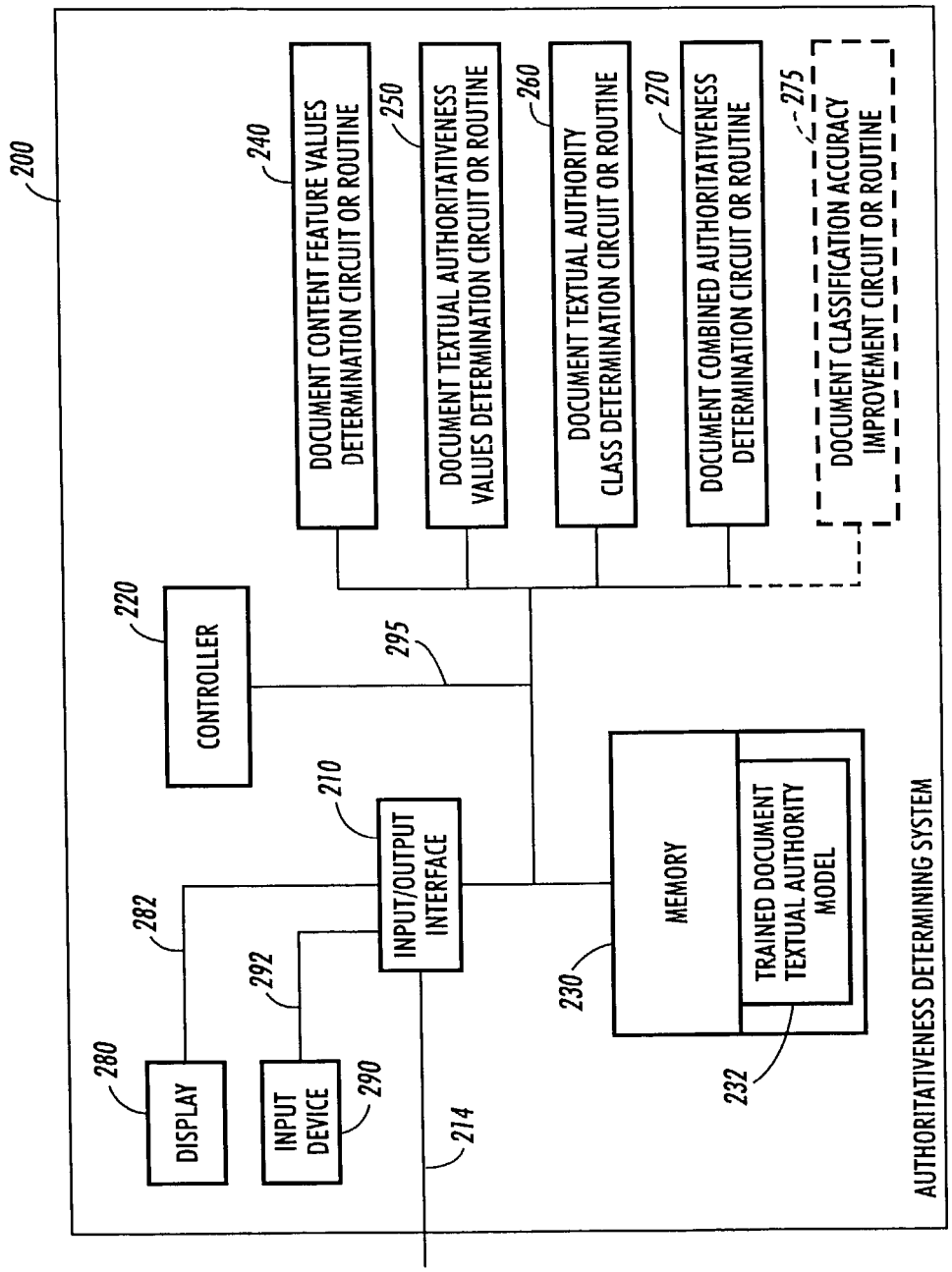
FIG. 2 is a functional block diagram of one exemplary embodiment of a system for authoritativeness grading, estimating and sorting according to this invention.

FIG. 2 illustrates a functional block diagram of one exemplary embodiment of the authoritativeness determining system 200. The authoritativeness determining system 200 connects to the network 110 via the link 214. The link 214 can be any known or later developed device or system for connecting the authoritativeness determining system 200 to the network 110, including a connection over public switched telephone network, a direct cable connection, a connection over a wide area network, a local area network, a storage area network, a connection over an intranet or an extranet, a connection over the Internet, or a connection over any other distributed processing network or system. In general, the link 214 can be any known or later developed connection system or structure usable to connect the authoritativeness determining system 200 to the network 110.

As shown in FIG. 2, the authoritativeness determining system 200 includes one or more display devices 280 usable to display information to the user, and one or more user input devices 290 usable to allow the user or users to input data into the authoritativeness determining system 200. The one or more display devices 280 and the one or more input devices 290 are connected to the authoritativeness determining system 200 through an input/output interface 210 via one or more communication links 282 and 292, respectively, which are generally similar to the link 214 above.

In various exemplary embodiments, the authoritativeness determining system 200 includes one or more of a controller 220, a memory 230, a trained document textual authority model 232, a document content feature values determination circuit or routine 240, a document textual authoritativeness value determination circuit or routine 250, a document textual authority class determination circuit or routine 260, and a document combined authoritativeness determination circuit or routine 270, all of which are interconnected over one or more data and/or control buses and/or application programming interfaces 295. In various exemplary embodiments, the authoritativeness determining system 200 may optionally include a document classification accuracy improvement circuit or routine 275, which is also connected to the one or more data and/or control buses and/or application programming interfaces 295. In various exemplary embodiments, the trained document textual authority model 232 is stored in memory 230 of the authoritativeness determining system 200.

The controller 220 controls the operation of the other components of the authoritativeness determining system 200. The controller 220 also controls the flow of data between components of the authoritativeness determining system 200 as needed. The memory 230 can store information coming into or going out of the authoritativeness determining system 200, may store any necessary programs and/or data implementing the functions of the authoritativeness determining system 200, and/or may store data and/or document authoritativeness information at various stages of processing.

The memory 230 includes any machine-readable medium and can be implemented using appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

In various exemplary embodiments, the authoritativeness determining system 200 includes the trained document textual authority model 232 which the authoritativeness determining system 200 uses to process a set of documents using the various circuits or routines 240, 250, 260, 270 and/or 275 to estimate the textual authoritativeness value and/or textual authority class of a document. The trained document textual authority model 232 is trained on a large sample of documents that were manually evaluated and labeled as to their degree of textual authority. The trained document textual authority model 232 is discussed in detail below.

Figure 3:
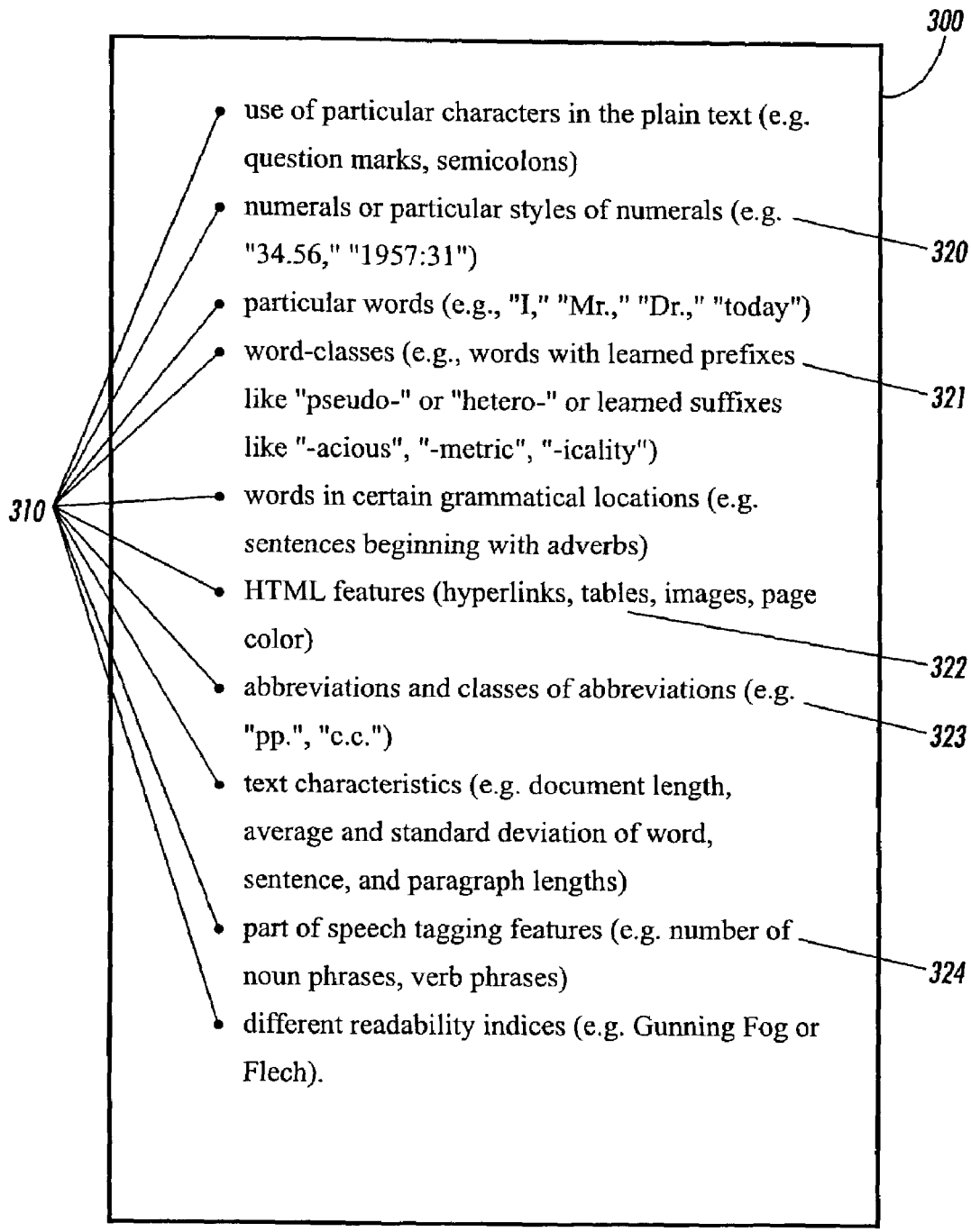
FIG. 3 illustrates one exemplary embodiment of document content features that can be used to determine the document textual authority according to this invention.

The document content feature values determination circuit or routine 240 is activated by the controller 220 to determine a document content feature values for a document. In various exemplary embodiments, the document content feature values determination circuit or routine 240 may be used to evaluate, for example identify and/or select, as shown in FIG. 3, specific document content features 310, such as, for example, one or more of question marks, numerals, words with learned prefixes or learned suffixes, hyperlinks, document length, abbreviations, number of noun phrases, that may be present in a web document, such as, for example a web page. It will be noted that FIG. 3 is an exemplary embodiment of document content features that may be used to determine the textual authority of a document.

In various exemplary embodiments, the document content feature values determination circuit or routine 240 evaluates and/or extracts only a subset, such as, for example, the numerals 320, words with learned prefixes or learned suffixes 321, hyperlinks 322, abbreviations 323, and number of noun phrases 324, as shown in FIG. 3, of the document content features from the large number of potential features 310, such as the question marks, numerals, words with learned prefixes or learned suffixes, hyperlinks, document length, abbreviations, number of noun phrases, that are available to use in ranking the documents based on these determined authoritativeness levels. The subset of document content features, such as, for example, the numerals 320, words with learned prefixes or learned suffixes 321, hyperlinks 322, abbreviations 323, and number of noun phrases 324, selected and/or extracted by the document content feature values determination circuit or routine 240 corresponds to a predetermined subset of document content features previously determined by and included in the trained document textual authority model 232. The predetermined document content features subset is discussed in more detail below.

It will be noted that the subset of document content features determined and/or extracted by the document content feature values determination circuit or routine 240 may vary according to the specific application, training data, particular web-based document features and the like.

In various exemplary embodiments, the document content feature values determination circuit or routine 240 determines a set of document content feature values for a document by processing one or more of the selected document content features 310. In various exemplary embodiments, the document content feature values determination circuit or routine 240 determines, as shown in FIG. 14, a set 340 of one or more document content feature values by processing the document content features subset using one or more of parsing and mathematical processes or methods. In one exemplary embodiment, the determined set 340 of document content features values may combine one or more individual document content features values 341, 342, 343 and 344 that are determined for specific types document content features in the document. In one exemplary embodiment, as shown in FIG. 14, the set 340 of document content feature values has a non-integer number value.

The document textual authoritativeness value determination circuit or routine 250 is activated by the controller 220 to determine a document's textual authoritativeness value based on the document content feature values determined by the document content feature values determination circuit or routine 240. In various exemplary embodiments, the document textual authoritativeness value determination circuit or routine 250 determines a document's textual authoritativeness value using the one or more determined document content feature values 341, 342, 343 and 344 of set 340 of document content feature values.

In various exemplary embodiments, the document textual authoritativeness value determination circuit or routine 250 determines a document's textual authoritativeness value 350–360, as shown in FIG. 13, by processing the set 340 of document content feature values using one or more statistical processes or techniques, such as, for example, a regression or classification process.

In various exemplary embodiments, the document textual authoritativeness value determination circuit or routine 250 determines a document's textual authoritativeness value 350 by processing the set 340 of document content feature values using one or more metric-regression algorithms or methods.

In various alternate exemplary embodiments, the document textual authoritativeness value determination circuit or routine 250 determines a document's textual authoritativeness value 360 by processing the set 340 of document content feature values using one or more boosted decision tree algorithms or methods. In one exemplary embodiment, the document textual authoritativeness value determination circuit or routine 250 determines a document's textual authoritativeness value 360 by processing the set 340 of document content feature values using an AdaBoost algorithm model, such as the algorithm outlined by Y. Freund et al., "Experiments with a new boosting algorithm, International Conference on Machine Learning, pp. 148–156, 1996. In one exemplary embodiment, the textual authoritativeness value 360 determined using an AdaBoost algorithm model is an integer number value.

It should be noted that other known or later-developed regression or classification processes may be employed to process the document content feature values to determine a document textual authoritativeness value, including, for example, using an ordinal regression process or using a multi-class classification process.

The document textual authority class determination circuit or routine 260 determines the textual authority class of a document based at least on the textual authoritativeness value 350–360 determined for that particular document. In various exemplary embodiments, the document textual authority class determination circuit or routine 260 maps or assigns the numerical value of the textual authoritativeness value 350–360 to a particular document textual authority class 430, such as, for example, the textual authority class "1", as shown in FIG. 6, using the trained document textual authority model 232.

In various exemplary embodiments, the document textual authority class determination circuit or routine 260 determines a document's textual authority class 430, such as, for example, the textual authority class "1" by either mapping the textual authoritativeness value 350 as computed by the circuit or routine 250 to the corresponding class assignment framework 440, as in the case or regression models, or by directly outputting the class label value computed by circuit 250, as in the case of the classification model.

In an exemplary embodiment, as shown in FIG. 13, the textual authority class 430 of a particular document is based at least on the numerical value of the textual authoritativeness value 350, rounded off to the nearest integer number. It will be noted that using an AdaBoost algorithm model provides an integer value representing the textual authority class of a document.

The document combined authoritativeness determination circuit or routine 270 is activated by the controller 220 to determine the overall authoritativeness of a document in various information retrieval applications, based in part on the textual authoritativeness value and/or textual authority class determined for a document. These information retrieval applications, such as, for example, re-ranking web document searches, determining the authoritativeness of a document based on textual and social authority, expanding web search queries, and determining an aggregate ranking of two or more rank orderings are discussed in detail below.

The document classification accuracy improvement circuit or routine 275 is activated by the controller 220 to improve the document authority classification and ranking processes by improving the textual authority estimation of documents included in the trained textual authority model 232. In various exemplary embodiments, the document classification accuracy improvement circuit or routine 275 incorporates user feedback to automatically adapt the system performance.

Figure 4:
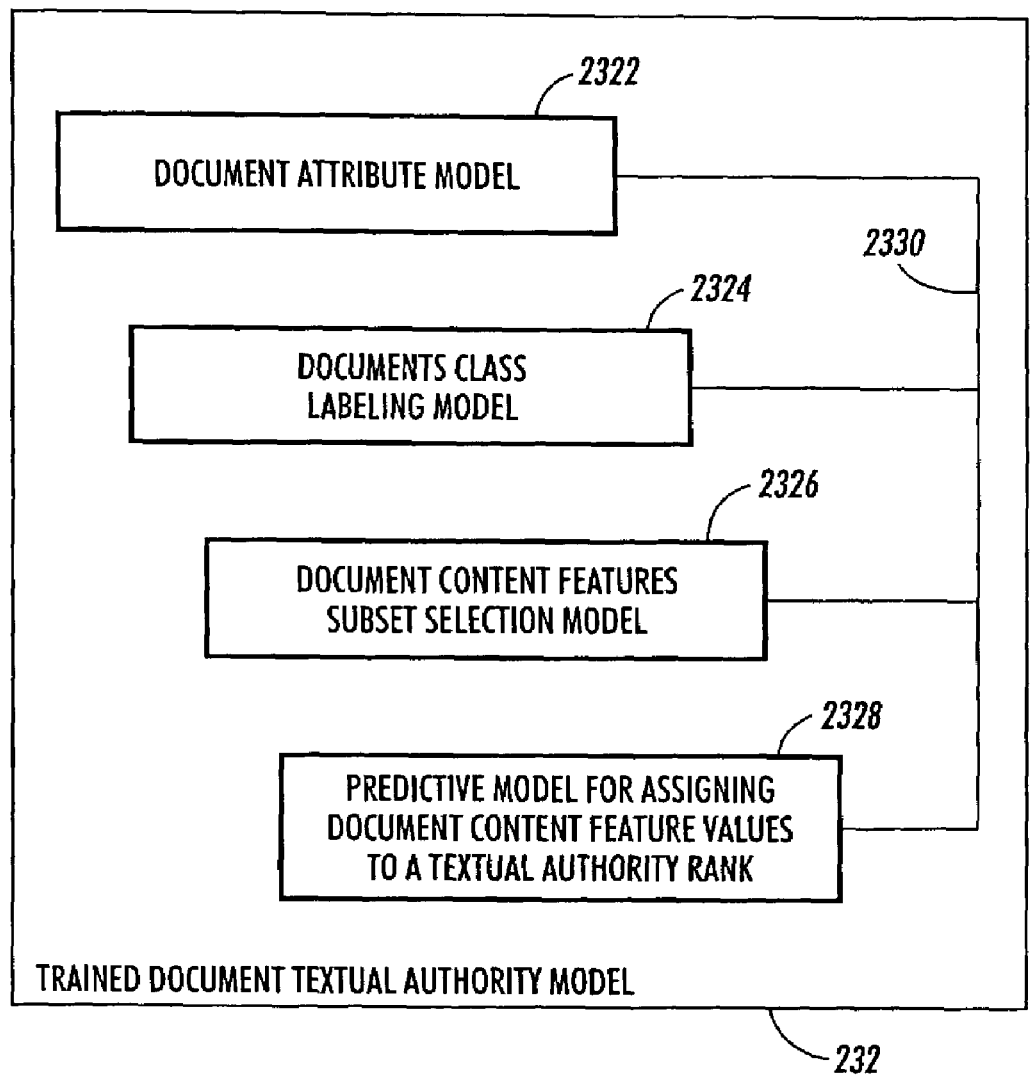
FIG. 4 is a functional block diagram showing in greater detail one exemplary embodiment of the trained document textual authority model of FIG. 2, according to this invention.

FIG. 4 shows in greater detail one exemplary embodiment of the trained document textual authority model 232. As shown in FIG. 4, in one exemplary embodiment, the trained document textual authority model 232 includes a document attribute model 2322, a document class labeling model 2324, a document content features subset selection model 2326, and a predictive model 2328, each usable to assign the set of document content feature values to a textual authority and/or to a textual authority class. It should be appreciated that while the trained model is entirely automatic, the process of training the document textual authority model 232 may not be entirely automatic. Rather, instructions associated with document attribute classification model 2322 and the document class labeling model 2324 may be manually or automatically executed, while instructions associated with the document content features subset selection model 2326 and the predictive model 2328 may be executed by an automatic execution, such as, for example, processor implemented operations, or by using fully automatic process operations.

In various exemplary embodiments, the document attribute model 2322 forms the basis for a person or machine to evaluate and classify a set of exemplary document attributes. As shown in FIG. 5, these exemplary document attributes 410 include (1) whether the document has been reviewed or examined by others, (2) the author's background, (3) the targeted audience, and (4) the author's institutional affiliation. For each document attribute 410 that is evaluated, the document attribute classification model 2322 provides possible qualitative values 420. It will be noted that the document classification attributes 410 and attribute values 420 shown in FIG. 5 represent only one exemplary embodiment. Other document attribute classification models within the scope of this invention may consider these and/or additional or alternative document classification attributes 410 and/or attribute values 420. For example, the place of publication, for example a particular newspaper website, the number and type of references in the document, or the presence of graphs may also be considered.

In various exemplary embodiments, the document class labeling model 2324 assigns an authority class to each document being analyzed by the trained document textual authority model 232, where the class is based on the exemplary document authority assigning framework shown in FIG. 6. The exemplary set of document authority classes covers a large portion of the documents available on the Internet and is particularly relevant to high-value informational domains like medical and scientific information. The document authority classes 430 range from the most authoritative documents, that is, documents written by someone with a scientific background for an audience with a scientific background, to documents written by a random person for anyone willing to read that person's postings.

In various exemplary embodiments, the document content features subset selection model 2326 evaluates and selects a subset of document content features from the large number of content features that may be present within a document, for use in ranking and classifying of documents with respect to authoritativeness levels. To fully capture and accurately represent documents that are typically encountered in web searches, a large number of document content features 310 that capture linguistic content, such as numerals, words with learned prefixes or learned suffixes, hyperlinks, abbreviations, number of noun phrases, and/or that capture presentation content, such as, for example, colors and/or tables of a web document or web page, may be considered. However, if all potential document content features 310 are used in determining the authoritativeness of a document, the features that are less informative as to authoritativeness often just add noise to the decision. Furthermore, adding these features in determining the authoritativeness of a document decreases the speed with which authoritativeness decisions can be made. The subset selection model 2326 uses the training set of documents that were manually labeled with respect to the authority of these documents using the document attribute classification model 2322 and the document class labeling model 2324.

In various exemplary embodiments, the document content features subset selection model 2326 selects a subset of document features using regression techniques, for example by performing a stepwise regression using the "Efroymson" method of the S software package, as outlined by R. A. Becker et al., "S-plus Reference Manual," Statistical Sciences Inc., Seattle, Wash., 1990, which is incorporated herein by reference in its entirety. The Efroymson method is an iterative method that adds a new document content feature variable to the selected set of document content features at each iteration, and then considers whether any of the content features currently in the subset should be dropped based on partial correlations between the new and selected set of features. In addition, other variables selection techniques, such as, for example, mutual information and AdaBoost can be used to select a content feature subset.

In various exemplary embodiments, the predictive model 2328, which is usable to assign document content feature values to a textual authority and/or a textual authority class, encodes the selected subset of document content features into a feature vector x. The predictive model 2328 then develops a predictive model that maps the feature vector x to an authority rank $a_{text}$.

In various exemplary embodiments, the predictive model 2328 uses a linear regression algorithm model or a boosted decision tree algorithm model as a prediction model to classify the documents. The predictive model 2328 uses the reduced document content features set as presented above and the manually-labeled training set of documents. The predictive model 2328 uses metric-regression techniques or boosted decision tree techniques to estimate the authority of each document in a test set separate from the training set. In alternate exemplary embodiments, the predictive model 2328 may employ other approaches, such as ordinal regression and multi-class classification techniques, to estimate the authority of a document based on the evaluated document content features of that document.

One exemplary set of document authority classes 430 developed and included in the trained model 232 is presented below, together with a short description or example. It should be appreciated that many of the examples are from the medical domain and are used for the purpose of illustration. For example, the document in the Authority Class 1 includes scientific documents created by or for a professional and written for other professionals. Examples of Authority Class 1 documents include scientific research papers and articles from the Center for Disease Control (CDC), or the New England Journal of Medicine. The documents in the Authority Class 2 include general information-scientific documents provided by scientific organizations and written for the general public. Examples of Authority Class 2 documents include press releases from the CDC, or the University of California at San Francisco (UCSF). The documents in the Authority Class 3 include documents that contain information provided by reputable sites. Examples of Authority Class 3 documents include documents provided by the health site "drkoop.com".

The documents in the Authority Class 4 include general information-news documents provided by news organizations for the general public. Examples of Authority Class 4 documents include documents provided by Time Magazine® or documents provided by Cable News Network@. The documents in the Authority Class 5 include documents provided by commercial entities. Examples of Authority Class 5 documents include documents provided by the commercial web site "drugstore.com". The documents in the Authority Class 6 include documents provided by mail groups and discussion lists, as well as newspaper opinion and editorial documents. The documents in the Authority Class 7 include documents provided by web home pages. Examples of Authority Class 7 documents include personal home pages and organization home pages, such as the home pages of the Green Party.

It should further be appreciated that there is an implicit ordering of the authoritativeness of these classes. All things being equal, people regard scientific documents as more authoritative then press reports, and press reports as more authoritative than information found on newsgroups. The ordering relation presented in FIG. 6 allows one to rank and compare the authority of different documents. As illustrated in FIG. 6, the authority of each class was mapped to an ordered set of the positive integers. In general, any monotonic map from the set of classes to the set of real numbers can be used to assign an authority class/rank 430, such as, for example, using Box-Cox transformations to map these integer features to continuous features. In the exemplary embodiment shown in FIG. 6, a map 440 was defined from the class of documents to positive integers, corresponding to the list shown in the FIG. 6.

It should further be appreciated that the authority classes 430 presented above represent only exemplary embodiments of such document authority classes. In practicing the various exemplary embodiments of the systems and/or the methods of this invention, other document authority classes and/or class assignment frameworks may be used. For example, a user may wish to assign an authority class 430 to web links pages that typically contain a short paragraph describing each link that occurs within that page. These pages may be assigned a possible authority class value of "8", because, although these pages may point to authoritative documents, they do not in themselves contain any authoritative information.

Figure 7:
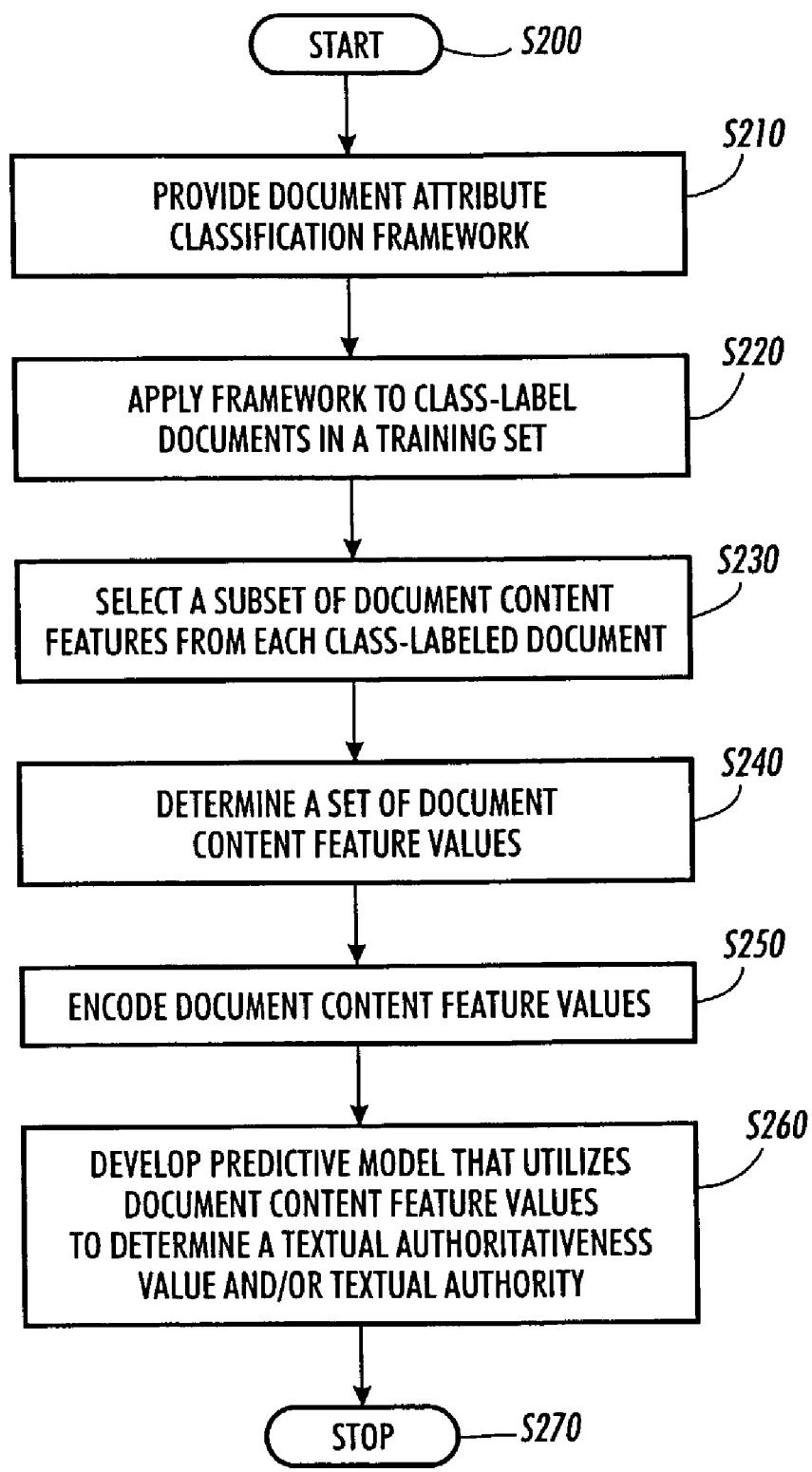
FIG. 7 is a flowchart outlining one exemplary embodiment of a method for training a model usable to determine the textual authoritativeness value and/or textual authority class of a document according to this invention.

FIG. 7 is a flowchart outlining one exemplary embodiment of a method for creating or "training" a document textual authority model using a set of labeled documents to create a trained document textual authority model according to this invention. As shown in FIG. 7, the method begins in step S200, and continues to step S210, where, for each document that is manually labeled, a set of exemplary document classification attributes are defined and evaluated according to a predetermined framework. In various exemplary embodiments, the framework considers and evaluates various document classification attributes, including, for example, whether the document has been reviewed by others, whether the author is a professional or a member of the general public, whether the target audience intended for or addressed to by the document is professional or general in nature, and/or whether the author is affiliated with a professional organization, the media, or with a commercial organization.

Then, in step S220, the document attribute evaluation framework and its results, as shown in FIGS. 5 and 6, is applied to assign an authority class to each document to be used to create the trained model. The set of document authority classes that can be assigned can be selected to cover a large portion of the documents available on the Internet and is particularly relevant to high-value informational domains like medical and scientific information. As shown in FIG. 6, the possible document authority classes range from the most authoritative documents, that is, documents written by someone with a scientific background for an audience with a scientific background, to documents written by a random person for anyone willing to read their web page.

Next, in step S230, a subset of document content features that are good predictors of the textual authoritativeness of a document are selected using an iterative stepwise regression technique. Then, in step S240, the selected subset of document content features is used to determine a set of document content feature values which may include one or more document content feature values. In step S250, the set of document content feature values is encoded into a feature vector x. Next, in step S260, a predictive model is developed that allows mapping of the feature vector x to an authority rank $a_{text}$. Operation then continues to step S270, where the operation of the textual authoritativeness training method stops.

Predicting the textual authority of a document represented by a feature vector x can be viewed as a cost-sensitive multi-class classification problem. Because of the relative ranked relationship between classes, the cost of misclassification is not the same between each pair of classes. That is, for example, the cost of misclassifying a home page as a scientific document is much higher then the cost of cost of misclassifying a general information document by a scientific organization as a scientific document. The inventors have discovered that in various exemplary embodiments, metric-regression algorithms and boosted decision trees achieve a good or high-quality trade-off between model and training complexity on one hand, and generalization and prediction on the other hand.

In various exemplary embodiments, in step S260, a linear regression model or a boosted decision tree may be used to classify the documents. The predictive model is developed using at least the subset of document content features selected in step 230 and the manually-labeled training set. The textual authoritativeness value of each document in a test set separate from the training set is then estimated using the regression model or the boosted decision tree model.

In various exemplary embodiments, in step S230, Efroymson's stepwise regression technique can be used to select a subset of document content features. The Efroymson method is an iterative method that adds a new document content feature variable to the selected set at each iteration, and then considers whether any of the content features currently in the subset should be dropped based on partial correlations between the new and selected set of features.

In particular, in the Efroymson's method, the method begins with an initially empty document content feature set. In each subsequent iteration, each document content feature not in the document content feature set is evaluated one at a time, and the best content feature for predicting authoritativeness from the set of test content features is selected. Partial correlations between the content feature selected in the current step and the content features that have already been selected are used to determine if any of the variables currently in the subset of selected document content features should be dropped.

Figure 8:
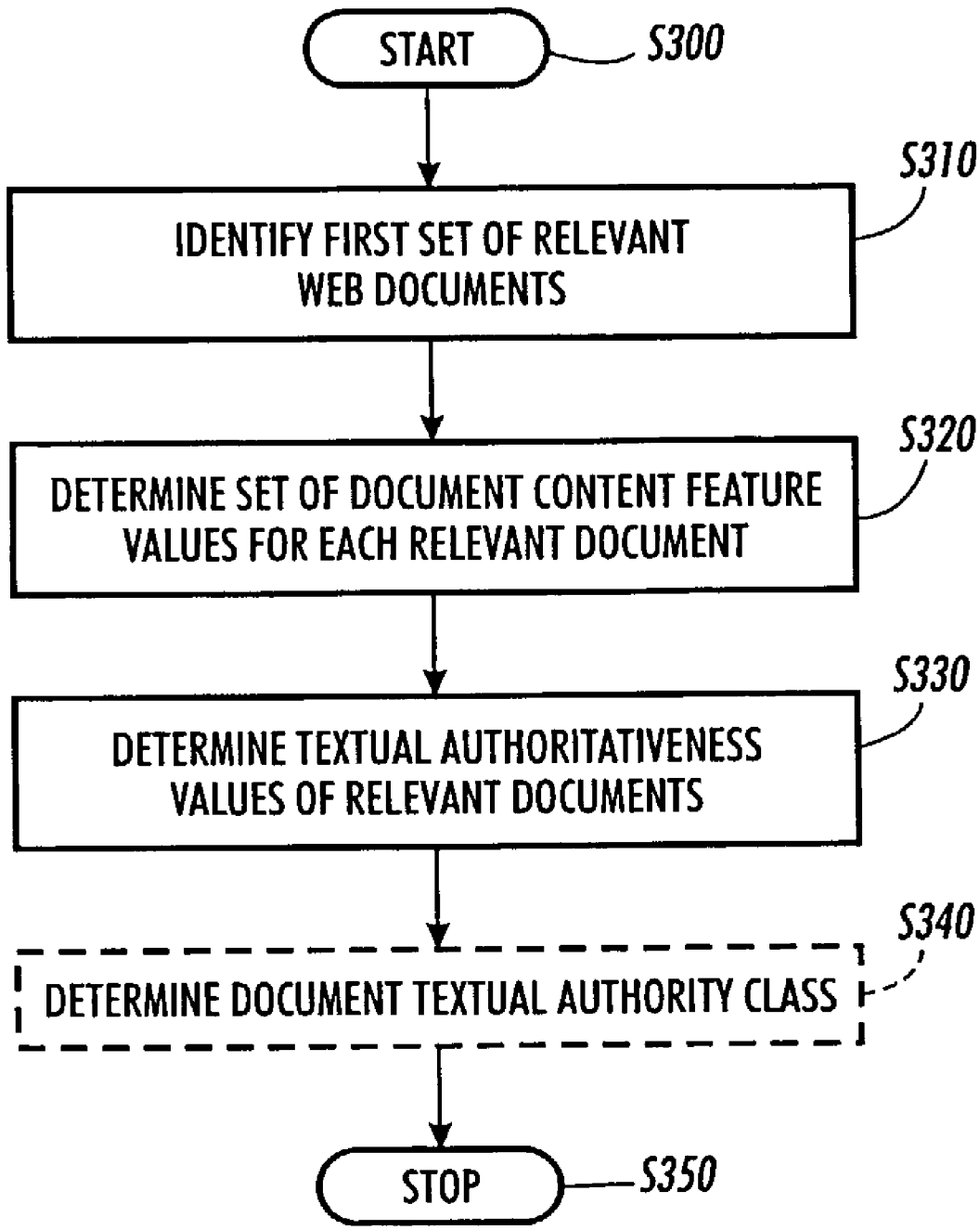
FIG. 8 is a flowchart outlining one exemplary embodiment of a method for determining the textual authoritativeness value and/or textual authority class of a document according to this invention.

FIG. 8 is a flowchart outlining one exemplary embodiment of a method for determining the textual authoritativeness of each document of a first set of one or more documents according to this invention. As shown in FIG. 8, the method begins in step S300, and continues to step S310, where the first set of relevant documents, such as, for example, a number of web documents, is identified. The first set of documents is identified by performing an initial web-based search using any known or later-developed web search techniques, such as, for example, using the Google® engine to issue a query and conduct a search for documents pertinent to a particular topic or subject area.

Next, in step S320, for each document in the first set of relevant documents, a set of document content feature values is determined. Then, in step S330, the textual authoritativeness value of each document is determined by processing the set of document content feature values determined using a trained document textual authority model. Operation then continues to step S340.

In the optional step S340, the textual authority class of each document in the first set of relevant documents is determined based on the textual authoritativeness value determined for each particular document and a textual authority class assignment framework in the trained document textual authority model. In various exemplary embodiments, each document may be further ordered, arranged, or ranked based on the textual authoritativeness value, textual authority class, and/or other quantitative measures of that document that may be associated with, or based on, the document content feature values of that document. Operation then continues to step S350, where operation of the method stops.

In various exemplary embodiments, in step S320, one or more document content feature values are included in the set of document content feature values for each document in the first set of relevant documents. One or more document content feature values are determined by processing a pre-determined subset of document content features found in a particular document through the trained document textual authority model. In one exemplary embodiment, one or more document content feature values for each document are determined by processing the predetermined subset of document content features using one or more of parsing and mathematical processes or methods.

In various exemplary embodiments, in step S330, the set of document content feature values of the document being evaluated are input to the trained document textual authority model. The document textual authority model uses the document content feature values to estimate the textual authoritativeness value of the document. This value may be a real number in the range of values for the class labels in 440, as shown in FIG. 6.

In various exemplary embodiments, in step S330, the textual authoritativeness value of each document is determined by processing the set of document content features values using one or more metric-regression algorithms or classification methods. In one exemplary embodiment, a linear regression model is used to process a set of document content feature values that will be used to characterize each document. In an alternate embodiment, a boosted decision tree method is used to process a set of document content feature values that will be used to characterize each document. In alternate exemplary embodiments, any other known or later-developed regression or classification methods, including, for example, an ordinal regression process or a multi-class classification process, may be employed to process the set of document content feature values that will be used to characterize each document.

In various exemplary embodiments, in optional step S340, the class associated with a value that most closely approximates in some way, such as, for example, a floor, or ceiling or rounding of, the estimated value may be selected as the document textual authority class for that document.

Figure 9:
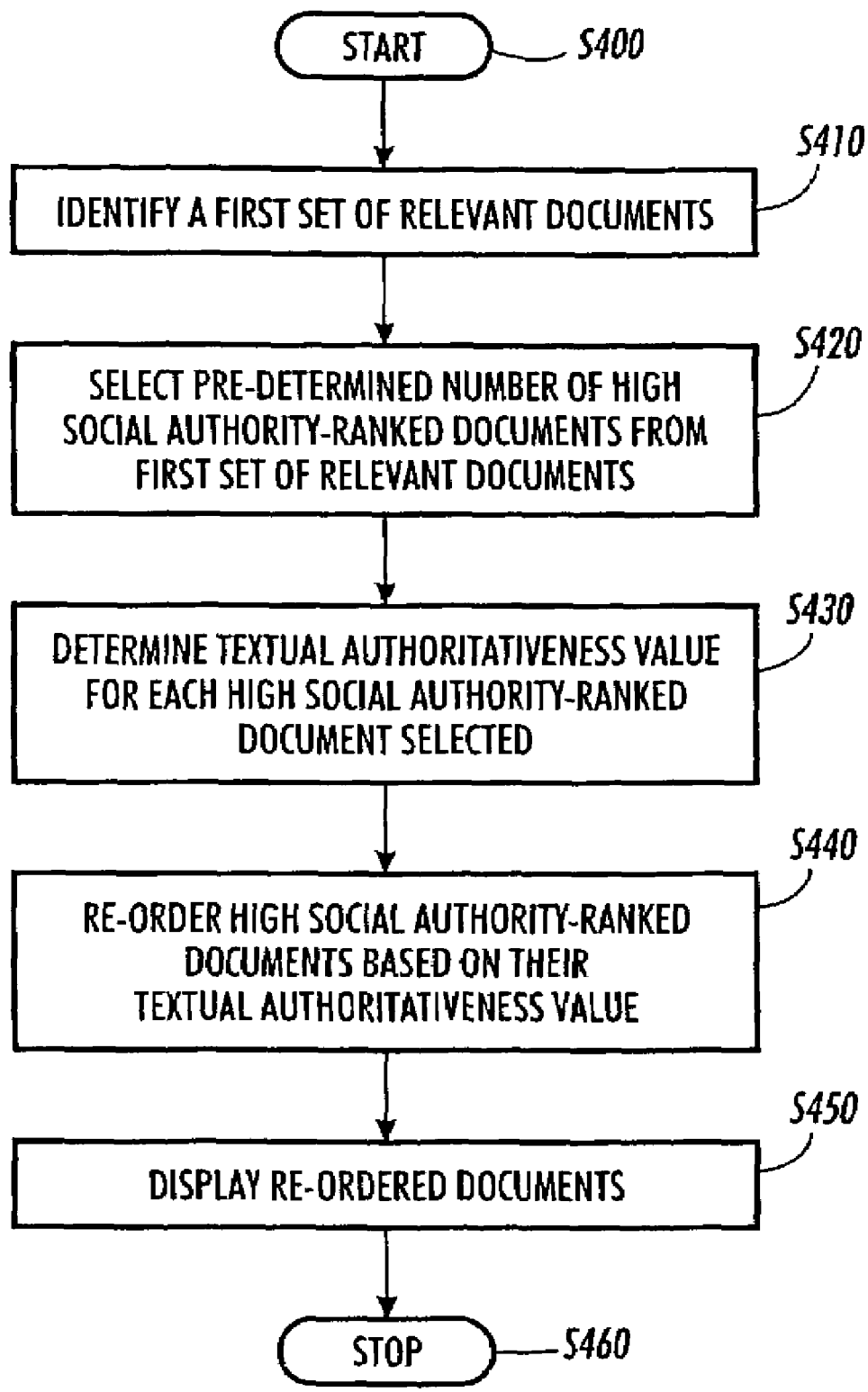
FIG. 9 is a flowchart outlining one exemplary embodiment of a method for applying textual authoritativeness estimates for re-ranking documents according to this invention.

FIG. 9 is a flowchart outlining one exemplary embodiment of a method for applying textual authoritativeness for determining methods to re-rank documents retrieved by search engines according to this invention. In a large heterogeneous and constantly evolving collection, such as the world wide web, the results returned by a search engine in response to a specific query often include a wide range of documents that encompass all ranges of authoritativeness. While this might be a desirable feature in some situations, users are more likely to be interested in a specific class of documents, such as, for example, scientific documents. One possible application of the textual authority determining method is to reorder and filter the search results according to the textual authority, and then return all the documents that fall within a certain authority range, such as, for example, scientific documents.

As shown in FIG. 9, the method begins in step S400, and continues to step S410, where a first set of relevant documents, such as, web documents, is identified. The first set of documents is identified by performing an initial web-based search using any known or later-developed web search technique, such as, for example, using the Google® engine to issue a query and conduct a search for documents pertinent to a particular topic or subject area.

Then, in step S420, a pre-determined number of high social authority-ranked documents, such as, for example, a number of the highest ranked documents, as identified by the web search engine, are selected from the first set of relevant documents. Next, in step S430, for each selected high social authority-ranked document, a textual authoritativeness value of the document is determined using one exemplary embodiment of a method for determining textual authoritativeness value according to this invention, such as the exemplary embodiment described with respect to FIG. 8. It will be noted that as part of step S430, a document textual authority class may be determined using one exemplary embodiment of a method for determining document textual authority class according to this invention, such as the exemplary embodiment described with respect to FIG. 8. Operation then continues to step S440.

In step S440, the high social authority-ranked documents are re-ordered based on one or more of determined textual authoritativeness value and determined textual authority class. In various exemplary embodiments, each document may be ordered, arranged, or ranked based on the textual authoritativeness value of that document, on the textual authority class of that document, or based on any other known or later-developed re-ranking scheme.

Next, in step S450, the documents that have been re-ordered or re-ranked based on their textual authoritativeness value and/or textual authority class are displayed based on the newly determined ranks. Operation then continues to step S460, where the operation of the method stops.

In various exemplary embodiments, in step S420, the number of top-ordered documents selected may be in a range of approximately 10–200 documents. It should be appreciated that other ranges of number of top-ordered documents may be selected based on, such as, for example, user preferences, application type, computing capabilities, etc. For example, in situations where the amount of information on a particular topic or subject area is significant, the number of top-ordered documents selected may be in a range of approximately 10–2000 documents or larger. Conversely, when only a small number of documents are retrieved by the search engine on a particular topic or subject area, the documents selected may include the entire identified set.

In various exemplary embodiments, in step S430, determining the textual authoritativeness value of a document includes, for example, determining a set of document content feature values for each document in the first set of relevant documents by processing a predetermined subset of document content features present in a particular document through the trained document textual authority model, and processing the set of document content feature values using one or more metric-regression algorithms or classification methods. In various exemplary embodiments, in step S430, determining the textual authority class of a document further includes using the textual authoritativeness value determined for each particular document to compare it with a set of textual authority class values using the textual authority class assignment framework in the trained document textual authority model.

Figure 10:
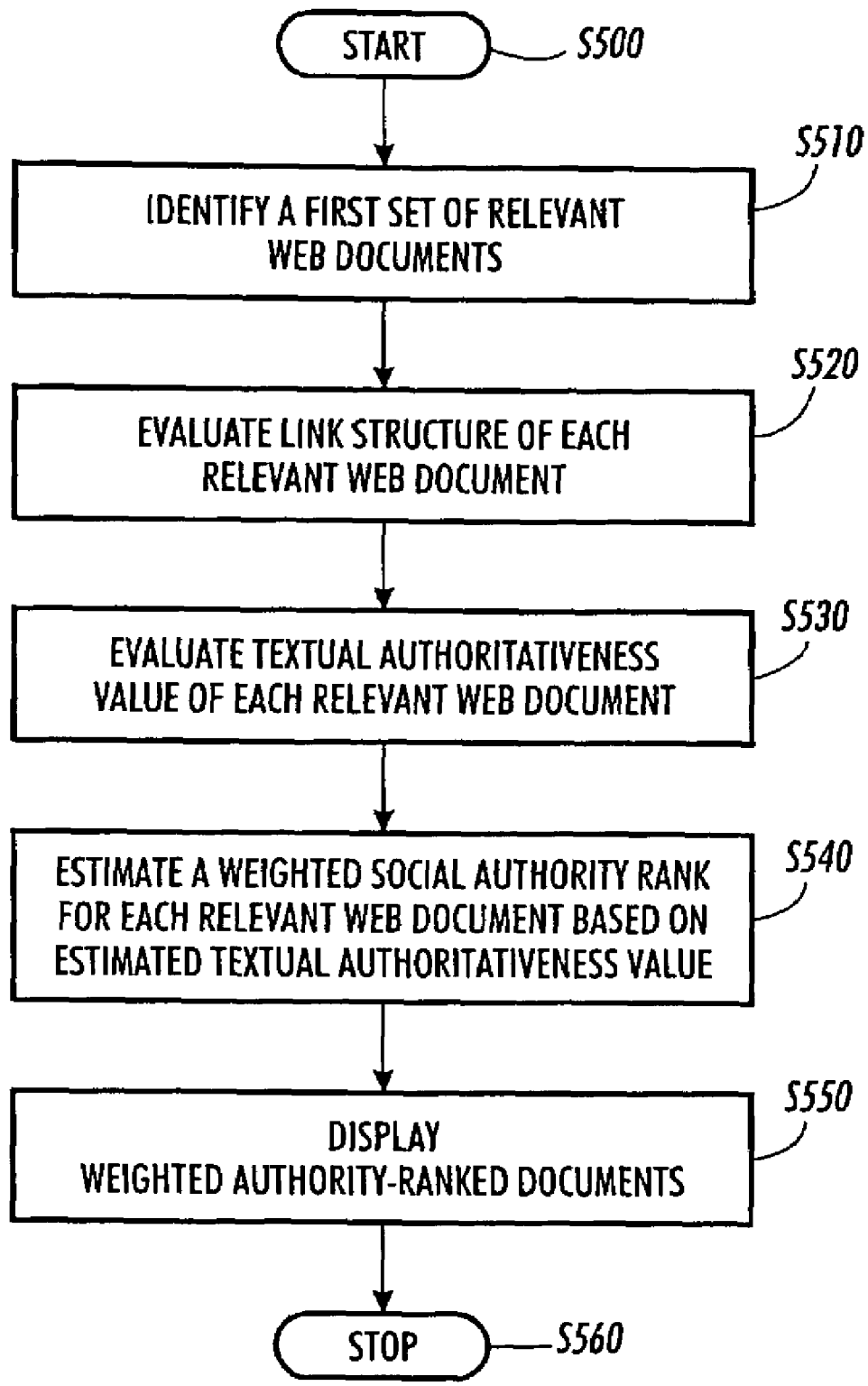
FIG. 10 is a flowchart outlining one exemplary embodiment of a method for combining textual authoritativeness with social authority according to this invention.

FIG. 10 is a flowchart outlining one exemplary embodiment of a method for combining textual authoritativeness with social authority to improve estimation of a document's authoritativeness according to this invention. As shown in FIG. 10, operation of the method begins in step S500, and continues to step S510, where a first set of relevant documents, such as, web documents, is identified. The first set of documents is identified by performing an initial web-based search using any known or later-developed web search technique, such as, for example, using the Google® engine to formulate a query and conduct a search for documents pertinent to a particular topic or subject area. Depending on the size of the first set of web documents identified, the first set of relevant documents may further be reduced using any known or later-developed search narrowing technique, such as, for example, Boolean techniques, specifying additional key words and/or parameters to the search engine, and the like.

Then, in step S520, the social authority or link structure of each relevant web document remaining in the set of relevant documents is evaluated. In various exemplary embodiments, the social authority or link structure of each top-ordered document is evaluated by determining the other documents in the document collection that the document links to or the other documents in the document collection that the document is linked to. Next, in step S530, for each selected document, the textual authoritativeness value is determined using one exemplary embodiment of a method for determining textual authoritativeness value according to this invention, such as the exemplary embodiment described with respect to FIG. 8. It will be noted that as part of step S530, a document textual authority class may be determined using one exemplary embodiment of a method for determining document textual authority class according to this invention, such as the exemplary embodiment described with respect to FIG. 8.

In step S540, for each relevant document, a weighted social authority rank is estimated based on the textual authority estimated for that particular document. Next, in step S550, the documents that have been ranked or ordered based on their weighted authority rank, as determined by combining textual authority with social authority estimates, are displayed. Operation then continues to step S560, where operation of the method stops.

In various exemplary embodiments, in step S530, determining the textual authoritativeness value of a document includes, for example, determining a set of document content feature values for each document in the first set of relevant documents by processing a predetermined subset of document content features present in a particular document through the trained document textual authority model, and processing the set of document content feature values using one or more metric-regression algorithms or classification methods. In various exemplary embodiments, in step S530, determining the textual authority class of a document further includes using the textual authoritativeness value determined for each particular document to compare it with a set of textual authority class values using the textual authority class assignment framework in the trained document textual authority model.

In various exemplary embodiments, in step S540, the document's textual authority estimates are combined with the social authority/link structure analysis using the methodology discussed in detail below.

The social authority of a page in a networked structure reflects how other members in that structure view that page. Generally, the more members in the community that point to a specific page, the higher the authority of that page. However, not all pages that make recommendations are equally selective in terms of the pages that they point at. For example, the original HITS algorithm defines the notion of "hub." A hub is a specific page that points to high-authority pages. Conversely, a high-authority page is pointed at by high-quality hubs.

In various exemplary embodiments, the method of combining textual authority with social authority according to this invention associates a set of hyper-linked pages V having a directed graph G=(V, E) with the nodes corresponding to the pages. A directed edge (p, q) ∈ E indicates the presence of an edge from p to q. The graph structure may be represented by the adjacency matrix A with entry a[i][j]=1 if there is a link from node i to node j, and is set to 0 otherwise.

The method defines the authority weight auth(p) and the hub weight hub(p) of page p as follows:

$$auth(p) = \sum_{q(q,p) \in E} hub(q) \quad (1)$$

$$hub(p) = \sum_{q(q,p) \in E} auth(q) \quad (2)$$

As outlined in "Authoritative sources in a hyperlinked environment," J. Kleinberg, Proc. of the $9^{th}$ ACM-SIAM Symposium on Discrete Algorithms, 1998, the authority weights correspond to the entries of the principal eigenvector of the matrix $A^T A$ and that the hub weights correspond to the entries of the principal eigenvector of the matrix $AA^T$. The algorithm used by the PageRank® search engine replaces the adjacency matrix A with the matrix M, where each row of matrix A is normalized to sum to 1:

$$P = \alpha U + (1-\alpha)M \quad (3)$$

where:

U is the transition matrix of uniform transition probability and represents a random transition to any page; and α represents the probability that a user will jump to a random page In one exemplary embodiment, α has a value in a range of approximately 0.1–0.2.

In its current form, the adjacency matrix assigns equal weights to all the links. The textual authority of a page provides an estimate of the intrinsic quality of the page and is therefore an indicator of the quality of the pages linked to by that document.

In various exemplary embodiments, a weighted social authority rank is determined using the textual authoritativeness value estimated for that particular document and replacing the entries of the adjacency matrix corresponding to page j by the textual authority of page j. Specifically, the textual authority can be combined with the social authority by setting m[i][j] to the normalized textual authority of the page i if the page i points to the page j and to zero otherwise.

$$m_w[i][j] = \begin{cases} \frac{auth_w(i)}{|i|} & \text{if } i \text{ points to } j \\ 0 & \text{otherwise} \end{cases} \quad (4)$$

where |i| is the out degree of page i. The adjacency matrix M is the matrix with ith and jth entry set to $m_w[i][j]$ In various exemplary embodiments, the weighted authority ranks are estimated as the entries of the principal eigenvectors of the matrix $A^T_w A_w$ when HITS-like algorithms or methods are used. In alternative exemplary embodiments, the weighted authority ranks are estimated as the principal right eigenvector of P when PageRank®-like algorithms or methods are used.

It should be appreciated that adding a few keywords or linking to good hubs would not significantly change the textual authority. In general, only an authoritative rewrite of the page will change the textual authority of a document. In that spirit, the textual authority produces a more robust weighting that can not be easily spoofed.

Figure 11:
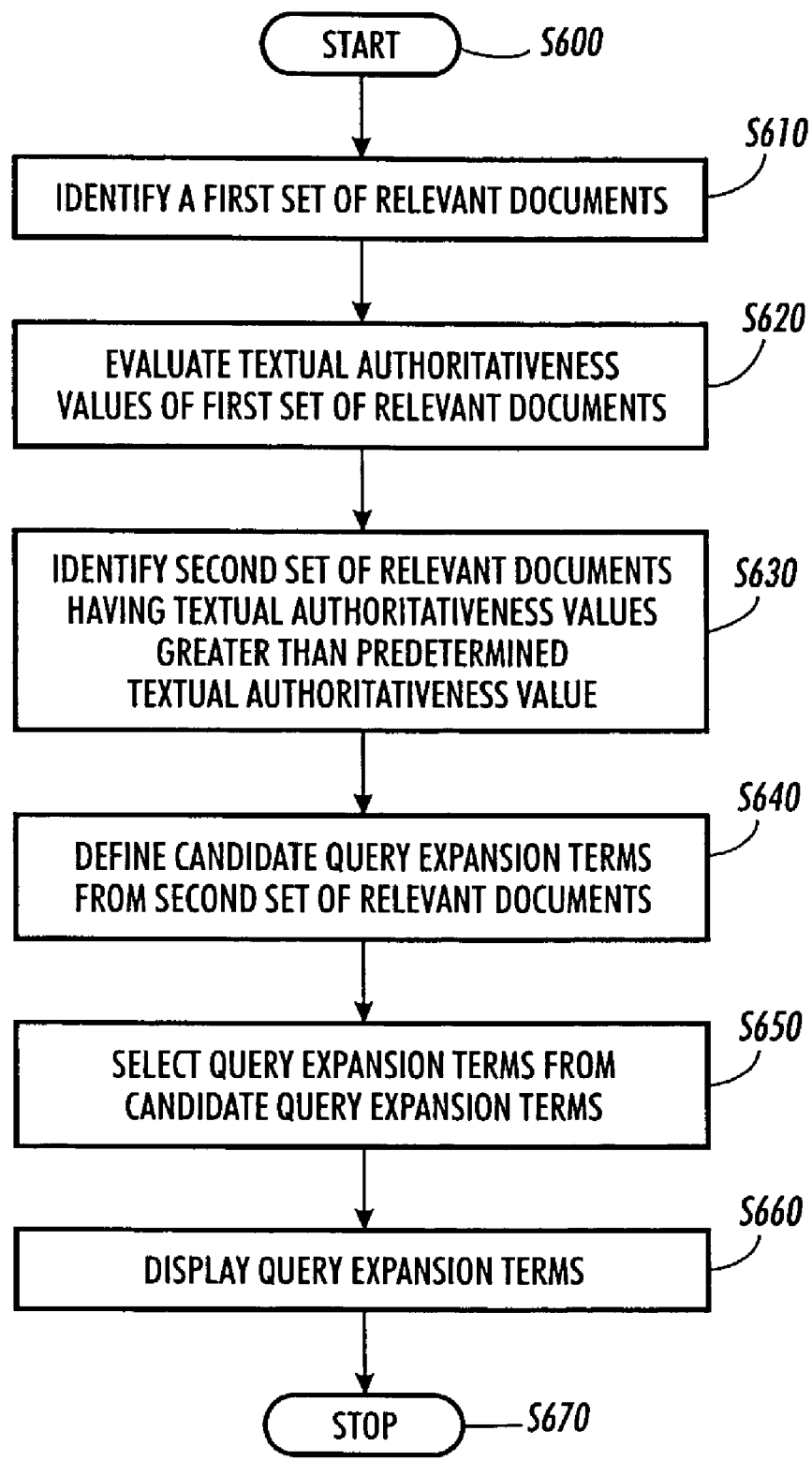
FIG. 11 is a flowchart outlining one exemplary embodiment of a method for applying textual authoritativeness estimates to expand document query searches according to this invention.

FIG. 11 is a flowchart outlining one exemplary embodiment of a method for applying textual authoritativeness estimates to expand and improve document query searches. In a large number of situations, the intended topic of a query is broader then the specific query terms. Thus, matching the query against the documents is usually not sufficient. Instead of directly using the query term, the query is first expanded into a broader query topic using textual authority estimating techniques.

Generally, the query expansion may include two phases. First, a search engine is used to get an initial set of relevant documents. The most frequent terms in the initial set or a subset of the initial set are then used to define a candidate set of query expansion terms. The actual query expansion terms are extracted from the candidate set using statistical tests. The concatenation of the new actual query expansion terms and the original query terms forms a new query that is given to a search engine. The search results for the new query provide a richer set of documents then the original query.

As shown in FIG. 11, the method begins in step S600, and continues to step S610, where a first set of relevant documents, for example, web documents, is identified. The first set of relevant documents may be identified by performing an initial web-based search using various known or later-developed web search techniques, such as, for example, using the Google® engine to issue a query and conduct a search for documents pertinent to a particular topic or subject area. Depending on the size of the first set of web documents identified, the document set may further be reduced using any known or later-developed search narrowing technique, such as Boolean techniques, specifying additional key words and/or parameters to the search engine, and the like. Then, in step S620, for each selected document, the textual authoritativeness value is determined using one exemplary embodiment of a method for determining textual authoritativeness according to this invention, such as the exemplary embodiment described with respect to FIG. 8. It will be noted that as part of step S620, a document textual authority class may be determined using one exemplary embodiment of a method for determining document textual authority class according to this invention, such as the exemplary embodiment described with respect to FIG. 8.

To ensure that highly authoritative documents are returned, the expanded query includes terms that correlate with textually authoritative documents. In various exemplary embodiments, candidate query expansion terms are extracted from textually authoritative documents whose textual authority exceeds a certain predetermined threshold, rather than from all documents in the first set of relevant documents.

Therefore, in step S630, before extracting candidate query expansion terms, a second subset of relevant documents is selected. This second subset of relevant documents includes documents whose textual authoritativeness values exceed a predetermined textual authoritativeness value. Next, in step S640, a candidate set of query expansion terms is defined by evaluating and extracting the most frequent terms present in the second subset of relevant documents. Then, in step S650, actual query expansion terms are selected from the candidate set of query expansion terms using one or more statistical tests. Operation then continues to step S660.

In step S660, the actual query expansion terms selected by combining textual authority with social authority are submitted to the search engine and the results displayed. Operation then continues to step S670, where the operation of the method stops.

In various exemplary embodiments, in step S620, determining the textual authoritativeness value of a document includes, for example, determining a set of document content feature values for each document in the first set of relevant documents by processing a predetermined subset of document content features present in a particular document through the trained document textual authority model, and processing the set of document content feature values using one or more metric-regression algorithms or classification methods. In various exemplary embodiments, in step S620, determining the textual authority class of a document further includes using the textual authoritativeness value determined for each particular document to compare it with a set of textual authority class values using the textual authority class assignment framework in the trained document textual authority model.

In various exemplary embodiments, in step S650, the actual query expansion terms can be selected from candidate query expansion terms using one or more statistical tests, such as, for example, the log likelihood ratio test, Fisher's exact ratio or mutual information. First, the log likelihood ratio test, as described in "Accurate methods for the statistics of surprise and coincidence," by T. E. Dunning, Computational Linguistics, Vol. 19, Issue No. 1, pp. 61–74, 1993, which is incorporated herein by reference in its entirety, is used to test whether the distribution of each of the candidate terms in the relevant documents is significantly different from its distribution in a general collection of documents. Next, if the distribution of specific term is significantly different, then the term is included in the set of actual query expansion terms.

In various exemplary embodiments, the log likelihood ratio (LLR) test can be conveniently formulated as illustrated in Table 1 below, where T (t, R) is the number of times a term "t" occurs in the relevant documents, T(t, N) is the number of times the term "t" occurs in the non-relevant documents, T(~t,R) is the number of times one or more terms ~t, other than "t" term, occur in the relevant documents, and T (~t, N) is the number of times the one or more terms ~t, other than "t" term, occurs in the non-relevant documents. The counts for T (t, N) and T (~t, N) are determined from a general corpus, as described in "100 million words of English: the British national corpus," by G. Leech, 1992, which is incorporated herein by reference in its entirety.

TABLE 1

Contingency Table for Log Likelihood Ratio Test

|  | term t | other terms |
|---|---|---|
| Relevant | T(t,R) | T(¬t,R) |
| non-relevant | T(t,N) | T(¬t,N) |

The log likelihood performs a hypothesis test. The null hypothesis is that a single model has generated the observed data. The alternate hypothesis is that two models generated the data. The null hypothesis H_0 is that the distribution of the term "t" is the same for the relevant and non-relevant documents and that the probability of observing a term from "t" is given by $$p_t^{null} = \frac{T(t, N) + T(t, R)}{T(t, N) + T(t, R) + T(\neg t, R) + T(\neg t, N)} \quad (5)$$

The probability of observing the data according to the null hypothesis is $$p(H_0) = p(T(t, N), T(t, R) | p_t^{Null}) \quad (6)$$

$$= \binom{T(t, N) + T(\neg t, N)}{T(t, N)} (p_t^{Null})^{T(t,R)} (1 - p_t^{Null})^{T(\neg t, N)} *$$

$$\binom{T(t, R) + T(\neg t, R)}{T(t, R)} (p_t^{Null})^{T(t,R)} (1 - p_t^{Null})^{T(\neg t, R)}$$

The alternate hypothesis is that the distribution of the term "t" is different for the relevant and non-relevant documents. The probability of observing the term "t" on the relevant documents is given by $$p_t^R = \frac{T(t, R)}{T(t, R) + T(\neg t, R)} \quad (7)$$

The probability of observing the term "t" in the non-relevant documents is given by $$p_t^N = \frac{T(t, N)}{T(t, N) + T(\neg t, N)} \quad (8)$$

The probability of observing the data according to the alternate hypothesis is $$p(H_1) = p(T(t, N), T(t, R) | p_t^N, p_t^R) \quad (9)$$

$$= \binom{T(t, N) + T(\neg t, N)}{T(t, N)} (p_t^N)^{T(t,N)} (1 - p_t^N)^{T(\neg t, N)} *$$

$$\binom{T(t, R) + T(\neg t, R)}{T(t, R)} (p_t^R)^{T(t,R)} (1 - p_t^R)^{T(\neg t, R)}$$

The log likelihood ratio compares the two hypotheses H_0, and H_1. In particular, we define $$\lambda = -2\log\left(\frac{p(H_0)}{p(H_1)}\right) \quad (10)$$

The quantity λ is asymptotically $X^2$ distributed with one degree of freedom. This allows us to attach a confidence measure to our test and only accept terms whose distributions differ significantly in the relevant and relevant documents.

The log likelihood ratio test is closely related to the concept of mutual information. In fact, we have $$-2\log\left(\frac{p(H_0)}{p(H_1)}\right) = 2 * M * I(t, d) \quad (11)$$

$$t = (t, \neg t)$$
$$d = (R, N)$$
$$M = T(t, N) + T(t, R) + T(\neg t, R) + T(\neg t, N)$$

where I(t, d) is the mutual information between the terms and the documents.

The concatenation of the new and old query terms forms a new query that is given to a search engine. The search results for the new query provide a richer set of documents then the original query.

Figure 12:
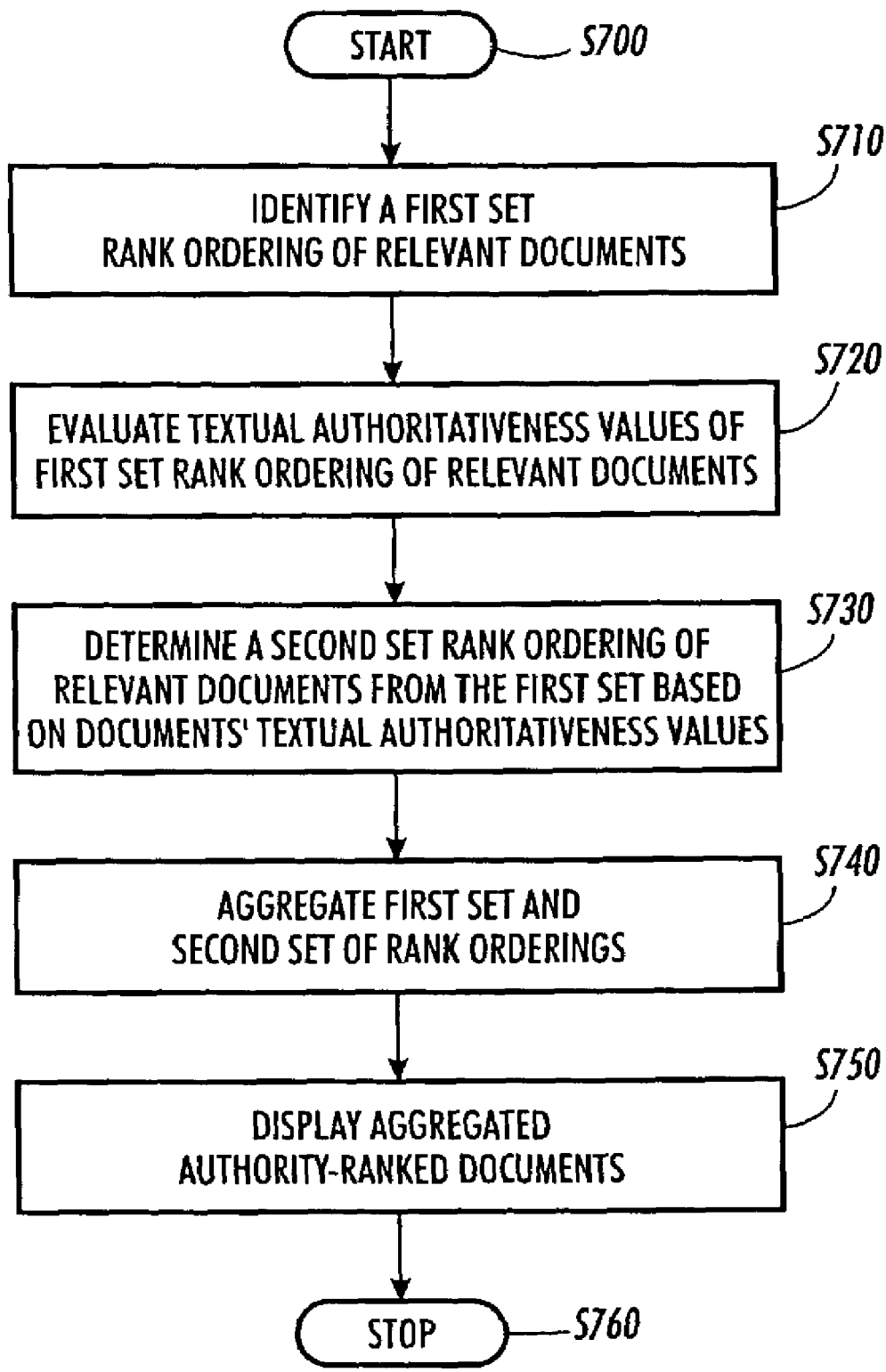
FIG. 12 is a flowchart outlining one exemplary embodiment of a method for combining or aggregating two or more sets of rank orderings, including at least one textual authoritativeness-based rank ordering and a link-based rank ordering, according to this invention.

FIG. 12 is a flowchart outlining one exemplary embodiment of a method for combining two or more document orderings or lists generated by various algorithms to produce a document aggregate ordering or list that is closest in some distance to each of the ordered lists. This method is particularly advantageous for determining a aggregate ranking or aggregate listing that includes both rank-ordered and numerically-ordered lists.

As shown in FIG. 12, the method begins in step S700, and continues to step S710, where a first set rank ordering or list of relevant documents, for example, web documents, is identified. The first set rank ordering of relevant documents may be identified by performing an initial web-based search using various known or later-developed web search techniques, such as, for example, using the Google® engine to issue a query and conduct a search for documents pertinent to a particular topic or subject area. Depending on the size of the first set rank ordering of web documents identified, the document set may further be reduced using any known or later-developed search narrowing technique, such as Boolean techniques, specifying additional key words and/or parameters to the search engine, and the like.

Then, in step S720, for each selected document, a textual authoritativeness value is determined using one exemplary embodiment of a method for determining a textual authoritativeness value according to this invention, such as the exemplary embodiment described with respect to FIG. 8. It will be noted that as part of step S720, a document textual authority class may be determined using one exemplary embodiment of a method for determining document textual authority class according to this invention, such as the exemplary embodiment described with respect to FIG. 8.

In step S730, a second list ordering of relevant documents is determined by ranking, ordering and/or selecting the first set or ordering of relevant documents based on their determined textual authoritativeness value. Next, in step S740, an aggregate ordering or list is determined by taking the first set or ordering of relevant documents, as identified by the search engine, and the second set or ordering of relevant documents, as identified using a textual authoritativeness value, and combining them using a rank aggregate algorithm model or method. Then, in step S750, the results of the aggregate ordering or aggregate list are displayed. Operation then continues to step S760, where the operation of the method stops.

In various exemplary embodiments, in step S720, determining the textual authoritativeness value of a document includes, for example, determining a set of document content feature values for each document in the first set of relevant documents by processing a predetermined subset of document content features present in a particular document through the trained document textual authority model, and processing the set of document content feature values using one or more metric-regression algorithms or classification methods. In various exemplary embodiments, in step S720, determining the textual authority class of a document further includes using the textual authoritativeness value determined for each particular document to compare it with a set of textual authority class values using the textual authority class assignment framework in the trained document textual authority model.

In various exemplary embodiments, in step S740, the aggregate ranking employs a rank aggregation algorithm model or method that is based at least on the $MC_4$ algorithm model, as outlined by C. Dwork et al. in "Rank aggregation methods for the web," in World Wide Web, pp. 613–622, 2001, and a Markov chain method. Generally, in the $MC_4$ algorithm model, as based on the Markov chains method, if the current state is page "P", then the next state is chosen by first picking a page "Q" uniformly from the union of all pages ranked by the ordering algorithm. Then, if page "Q" is ranked higher than page "P" by the majority of ordered lists, state is directed to "Q"; otherwise, state stays in "P".

The Markov chain approach has two advantages over a procedure that attempts to rank the pages using the average rank of each page. First, the procedure can handle both rank ordered and numerically ordered lists. Second, and perhaps more important, is that the procedure is robust. In the case of the average ranking, a single list can give a very high or low rank to specific item and can thus change the average weight. For the Markov chain approach, a very high rank or very low rank will have the same effect as a high rank or a low rank, namely that the item should ranked high or low, respectively.

The $MC_4$ induces a state transition matrix T, and assumes $\lambda_a > \lambda_b > \ldots \lambda_k$, where $\lambda_a$ is the "$a_{th}$" eigenvalue of T. Then the desired ordering of the pages is given by "a, b, . . . k", the stable distribution of the Markov chain.

The $MC_4$ algorithm, much like the PageRank® algorithm, describes the behavior of a surfer whose transitions are governed by the state transition matrix T. The $MC_4$ rank aggregation algorithm presented above uses a majority vote to compute the state transition matrix T.

In various exemplary embodiments, a rank aggregation algorithm model is determined by modifying the $MC_4$ algorithm model and allow higher weights to be assigned to "good" lists. A good list is a balanced list, for example a list that is close to the general consensus. The general consensus in this case, is the aggregate ordering of the lists. The aggregate list is computed using the pseudo-code shown in Table 2 below. The procedure simultaneously computes a weighted ranking of reviewers as well as an aggregate ranking of the lists.

TABLE 2

Compute Weighted State Matrix with Hard Transition

```
Inputs:     Matrix T
Inputs:     Lists l₁, l₂, . . . lₙ,
            weights w(1) . . . w(n)
Outputs:    State transition matrix T
for  each element i do
     for    each element j ≠ i do
            for each list k do
                       f(i, j, k) = 1 if i is ranked higher
                         then j by list k
                       f(i, j, k) = -1 other wise
                       T (i, j) = T (i, j) + f(i, j, k) * weight(k)
            endfor
            ifT(i,j) < 0), T(i,j) = 0)
     endfor
endfor
```

Normalize State Matrix

```
Inputs:     Matrix T
Outputs:    State transition matrix T
for   each row i do
         trans_out = number of non zero entries of row i
         trans_in = number of zero entries of row i
         trans_total = number of entries of row i
         votes_out = summation of non zero entries of row i
```

$$p_{in} = \frac{trans_{in}}{trans_{total}}$$

$$p_{out} = \frac{trans_{out}}{trans_{total}}$$

T(i,i) = $p_{in}$
for each entry j ≠ i $$T(i, j) = p_{out} \frac{T(i, j)}{votes_{out}}$$

```
         endfor
endfor
```

Rank Aggregation with Hard Transition

```
Inputs: Lists l₁, l₂, . . . lₙ weights w(l) . . . w(n)
Outputs:    List lₐ
            compute state matrix T using weights w₁ⁱ, . . . wₙⁱ
            normalize state matrix T
            compute the stable distribution induced by T
            order the states using the stable distribution
            return a list of state lₐ
end
```

Weighted Rank Aggregation with Hard Transition

```
Inputs: Lists l₁, l₂, . . . lₙ
Outputs:    List lₐ and weights w₂, w₂ . . . wₙ
```

Initialize, i = 0, $w_1^i, w_2^i, \ldots w_n^i = \frac{1}{n}$ while not converged do
    $l_1$ = Aggregate List with Hard Transitions using weights $w_1^i, \ldots w_n^i$ for each list j compute the correlation $c_j^i$ between $l_j$, $l_a^i$ for each list j set $w_j^{i+1} = \frac{c_j^i}{\sum c_j^i}$ if $\forall j |w_j^{i+1} - w_j^i| < \epsilon$ then converged endwhile In various exemplary embodiments, the procedure allows a transition from page "P" to page "Q" whenever one of the experts ranks page "P" higher than page "Q". Computing the entries of the state transition matrix is performed using the following expressions:

$$p(x_i \mid x_i) = \sum_k (p_c(x_i \mid x_i) p_t(x_i \mid x_i) + \qquad (12)$$

$$\sum_{j \neq 1} p_c(x_j \mid x_i)(1 - p_t(x_j \mid x_i, e_k) p(e_k))$$

$$p_c(x_i \mid x_i) = p_c(x_i \mid x_j) = p_0 \qquad (13)$$

$$p(x_i \mid x_i) = p_o \sum_k \left[ 1 + \sum_{j \neq 1} (1 - p_t(x_j \mid x_i, e_k) p(e_k)) \right]$$

$$p(x_j \mid x_i) = \sum_k p_c(x_j \mid x_i) p_t(x_j \mid x_i) p(e_k) \qquad (14)$$

$$p(x_j \mid x_i) = p_o \sum_k p_t(x_j \mid x_i) p(e_k) \qquad (15)$$

where $p_t(x_j|x_i, e_k)$ is the probability of transitioning from page "i" to page "j" based on the recommendation of list "k", and $p_o = p_c(x_i|x_j) = p_c(x_j|x_i)$ is the probability that any page will be selected at random. Table 3 shows the pseudo code for one run of the algorithm, however, it is not iterative. The pseudo-code for iteratively finding the aggregate list and the expert weights is shown in Table 4.

TABLE 3

Inputs: Lists $1_1, 1_2, \ldots 1_n$ weights $w(1) \ldots w(n)$
Outputs: List $1_a$
    use Equations 12 and 15 to compute state matrix T
    compute the stable distribution induced by T
    order the states using the stable distribution
    return a list of state $1_a$
end Knowing prior information about the quality of the experts, the optimal weights for the experts can be computed as shown in pseudo-code outlined in Table 4.

TABLE 4

Inputs: Lists $1_1, 1_2, \ldots 1_n$
Outputs: List $1_a$ and weights $w_1, w_2 \ldots w_n$ Initialize, $i = 0$, $w_1^i, w_2^i, \ldots w_n^i = \frac{1}{n}$ while not converged do $l_a^i$ = Aggregate Rank with Soft Transition using weight $w_1^i, \ldots w_n^i$ for each list j compute the correlation $c_j^i$ between $t_j, t_a^i$ for each list j set $w_j^{i+1} = \frac{c_j^i}{\sum c_j^i}$ if $\forall j |w_j^{i+1} - w_j^i| < \epsilon$ then converged endwhile The rank aggregation algorithm model or method above allows for simultaneously determination of the aggregate ranking as well as for determining the weight or quality of each of the lists. The rank aggregation algorithm model or method may be used for determining the ranking of both rank-ordered and numerically-ordered lists.

As shown in FIG. 1, in various exemplary embodiments, the authoritativeness determining system 200 is implemented on a programmed general purpose computer. However, the authoritativeness determining system 200 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 7–11, can be used to implement the authoritativeness determining system 200.

Moreover, the authoritativeness determining system 200 can be implemented as software executing on a programmed general purpose computer, a special purpose computer, a microprocessor or the like. In this case, the authoritativeness determining system 200 can be implemented as a resource residing on a server, or the like. The authoritativeness determining system 200 can also be implemented by physically incorporating it into a software and/or hardware system, such as the hardware and software systems of a general purpose computer or of a special purpose computer.

Although the invention has been described in detail, it will be apparent to those skilled in the art that various modifications may be made without departing from the scope of the invention.

What is claimed is:

1. A method for re-ranking a set of relevant documents identified following a search, the method comprising:
   determining a set of document content feature values for each relevant document identified;
   generating a textual authoritativeness value and determining a textual authority class for each relevant document using a trained document textual authority model based on the determined set of document content feature values, the trained document textual authority model reclassifying the documents by assigning the document content feature values to a textual authority rank;
   rearranging the set of relevant documents in an order selected based on the textual authority rank by using the generated textual authoritativeness value and the determined textual authority class for the documents to rearrange the set of relevant; and
   displaying the rearranged set of relevant documents;
   wherein the textual authoritativeness value is generated for each document using a document textual authority framework model that considers at least one of an author's background, a targeted audience, an author's institutional affiliation, or whether the document has been reviewed by others.

2. The method of claim 1, further comprising selecting a subset of relevant documents from the set of identified relevant documents prior to determining a set of document content feature values for each relevant document.

3. The method of claim 2, wherein selecting the subset of relevant documents comprises selecting a predetermined number of top-ordered documents as identified during the search.

4. The method of claim 1, wherein determining the set of document content feature values comprises determining the set of document content feature values using one or more parsing techniques or methods.

5. The method of claim 1, wherein generating the textual authoritativeness value for each relevant document comprises:
providing the set of document content feature values to the trained document textual authority model; and
processing the set of document content feature values using one or more metric-regression algorithms or methods.

6. The method of claim 1, wherein generating the textual authoritativeness value for each relevant document comprises:
providing the set of document content feature values to the trained document textual authority model; and
processing the set of document content feature values using one or more AdaBoost algorithm model or method.

7. A method for determining the authoritativeness of a document having a plurality of document content features, the method comprising:
selecting a predetermined number of top-ordered documents identified following a topic search of a large document collection;
evaluating a link structure of each top-ordered document;
determining a textual authority from a textual authoritativeness value and a textual authority class of each top-ordered document;
determining a weighted social authority rank for each top-ordered document based on the textual authority of each top-ordered document by associating a set of hyper-linked pages with a set of corresponding nodes using an adjacency matrix; and
displaying the weighted social authority ranked documents,
wherein the textual authoritativeness value is generated for each document using a document textual authority framework model that considers at least one of an author's background, a targeted audience, an author's institutional affiliation, and whether the document has been reviewed by others.

8. The method of claim 7, wherein evaluating the link structure of each top-ordered document comprises evaluating whether the document links or points to other documents in the document collection or whether the document is pointed to or linked to by other documents in the document collection.

9. The method of claim 7, wherein evaluating the link structure of each top-ordered document comprises:
determining whether the document in the set of top-ordered documents points to other documents in the set; and
setting the corresponding entry in the adjacency matrix to "1" if the document points to another document or to "0" if the document does not point to the another document.

10. The method of claim 7, wherein determining the textual authority of each top-ordered document comprises:
extracting a plurality of document content features from each top-ordered document;
determining a set of document content feature values for each top-ordered document; and
generating a textual authoritativeness value or determining a textual authority class for the document using a trained document textual authority model based on the determined set of document content feature values.

11. The method of claim 10, wherein determining the set of document content feature values comprises determining the set of document content features values using one or more parsing techniques or methods.

12. The method of claim 7, wherein determining the textual authority comprises using one or more of metric regression or boosted decision tree algorithms or methods.

13. The method of claim 7, wherein estimating a weighted social authority rank for each top-ordered document is performed by determining entries of eigenvectors of a matrix P, where:

$$P = \alpha U + (1-\alpha) M$$

where:
M is the adjacency matrix in which each row is normalized to a sum of "1";
U is a transition matrix of uniform transition probability and represents a random transition to any page; and
$\alpha$ [i][j] is set to the textual authority of a page i if the page i points to a page j, and is set to zero otherwise.

14. A method for expanding a search query based on a textual authoritativeness of a document, the method comprising:
identifying a first set of relevant documents using an initial set of query terms;
generating a textual authoritativeness value for each document of the first set of relevant documents;
identifying a second set of relevant documents from the first set of relevant documents based on the textual authoritativeness values generated for at least some of the first set of documents;
defining a candidate set of query expansion terms from the second set of relevant documents by evaluating and extracting at least one term most frequently present in the second set of relevant documents;
selecting at least one query expansion term from the candidate set of query expansion terms; and
displaying the at least one ciuerv expansion term;
wherein the textual authoritativeness value is generated for each document using a document textual authority framework model that considers at least one of an author's background, a targeted audience, an author's institutional affiliation, and whether the document has been reviewed by others.

15. The method of claim 14, wherein identifying a second set of relevant documents comprises selecting documents having textual authoritativeness values based on a user-determined textual authoritativeness value.

16. The method of claim 14, wherein selecting at least one query expansion term comprises extracting the at least one query expansion term from the candidate set of query expansion terms using at least one statistical test.

17. The method of claim 16, wherein the at least one statistical test comprises at least one of log likelihood ratio test, Fisher's exact test and mutual information test.

18. The method of claim 14, wherein selecting at least one query expansion term from the candidate set of query expansion terms comprises:
estimating a first distribution for each query expansion term in the first set of relevant documents;
estimating a second distribution for each query expansion term in the second set of relevant documents;

applying a statistical test to each query expansion term in the candidate set of query expansion terms to compare the first and second distributions estimated for each query expansion term; and selecting at least one query expansion term from the candidate set of query expansion terms based on values obtained from first and second distribution comparisons performed on the candidate set of query expansion terms.

19. The method of claim 14, wherein generating a textual authoritativeness value for each document identified in the first set of relevant documents comprises:

extracting a plurality of document content features from each document identified in the first set of relevant documents;

determining a set of document content feature values for each document identified in the first set of relevant documents; and generating a textual authoritativeness value and a textual authority class for the document using a trained document textual authority model based on the determined set of document content feature values.

20. A method of combining at least two sets of rank orderings to produce an aggregate set ordering that is closest in some distance to each of the at least two sets of rank orderings, the method comprising:

determining first set rank ordering of relevant documents; generating a textual authoritativeness value for each document in the first set rank ordering of relevant documents;

determining a second set rank ordering of relevant documents from the first set rank ordering based on the textual authoritativeness value generated for at least some of the first set of documents; and combining the first set rank ordering of relevant documents and the second set rank ordering of relevant documents using a rank aggregation algorithm model or method based on a Markov chain, further including:
assigning a current state to a first page from the first set rank ordering,
selecting at least one second page uniformly chosen in an ordered list from at least one of the first set rank of ordering and the second set rank of ordering,
determining a first rank for the first page,
determining at least one second rank for the at least one second page in the ordered list,
reassigning the current state to the second page if the second page is ranked higher than the first page by the majority of the ordered lists, and
displaying the combined set of relevant documents,
wherein the textual authoritativeness value is generated for each document using a document textual authority framework model that considers at least one of an author's background, a targeted audience, an author's institutional affiliation, and whether the document has been reviewed by others.

21. The method of claim 20, wherein determining a textual authoritativeness for each document determined in the first set rank ordering of relevant documents comprises:

extracting a plurality of document content features from each document identified in the first set rank ordering of relevant documents;

determining a set of document content feature values for each document identified in the first set rank ordering of relevant documents; and generating a textual authoritativeness value or determining a textual authority class for the document using a trained document textual authority model based on the determined set of document content feature values.

22. The method of claim 21, wherein determining a textual authoritativeness value or a textual authority class for each document determined in the first set rank ordering of relevant documents comprises processing the determined set of document content feature values using one or more of metric regression or boosted decision tree algorithms or methods.

23. The method of claim 21, wherein the plurality of document content features includes at least some of question marks, semicolons, numerals, words with learned prefixes, words with learned suffixes, words in certain grammatical locations, HTML features, abbreviations and classes of abbreviations, text characteristics features, speech tagging features and readability indices features.

24. A method for simultaneously estimating an aggregate rank and aggregate weights to be assigned to two or more ranked document lists or document rank orderings, the method comprising:

determining a first set rank ordering of relevant documents; generating a textual authoritativeness value for each document in the first set rank ordering of relevant documents;

determining a second set rank ordering of relevant documents from the first set rank ordering based on the textual authoritativeness values generated for at least some of the first set of documents; and combining the first set rank ordering of relevant documents and the second set rank ordering of relevant documents using a rank aggregation algorithm model or method based on a Markov chain, further including:
assigning a current state to a first page from the first set rank ordering,
selecting at least one second page uniformly chosen in an ordered list from at least one of the first set rank of ordering and the second set rank of ordering,
determining a first rank for the first page,
determining at least one second rank for the at least one second page in the ordered list, and
reassigning the current state to the second page if the second page is ranked higher than the first page by the majority of the ordered lists, and
displaying the combined set of relevant documents,
wherein the textual authoritativeness value is generated for each document using a document textual authority framework model that considers at least one of an author's background, a targeted audience, an author's institutional affiliation, and whether the document has been reviewed by others.

25. The method of claim 24, wherein generating a textual authoritativeness value for each document determined in the first set rank ordering of relevant documents comprises:

extracting a plurality of document content features from each document identified in the first set rank ordering of relevant documents;

determining a set of document content feature values for each document using one or more parsing processes or methods; and generating a textual authoritativeness value by processing the determined set of document content feature values using one or more of metric regression or boosted decision tree algorithms.

26. The method of claim 24, wherein the plurality of document content features includes at least some of question marks, semicolons, numerals, words with learned prefixes, words with learned suffixes, words in certain grammatical locations, HTML features, abbreviations and classes of abbreviations, text characteristics features, speech tagging features and readability indices features.

27. The method of claim 24 further comprising determining a textual authority class for the document prior to determining a second set rank ordering of relevant documents.

28. The method of claim 7, wherein determining a weighted social authority rank further includes: defining an authority weight for a page of the each top-ordered document as a sum of hub weights of a plurality of adjacent pages;
   defining a hub weight for the page as a sum of authority weights of the plurality of adjacent pages, the hub weight representing relative measuring of a hub, the hub being a specific page that points to high-authority pages;
   combining the textual authority and the weighted social authority rank for the each top-ordered document by setting elements of the adjacency matrix to a normalized textual authority if a page i points to an adjacent page j and to "0" otherwise.

29. The method of claim 20, wherein combining the first set rank ordering and the second set rank ordering further includes computing a state transition matrix that includes eigenvalues $\lambda_a > \lambda_b > \ldots \lambda_k$ for a desired order of pages a, b, ..., k.

30. The method of claim 24, wherein combining the first set rank ordering and the second set rank ordering further includes computing a state transition matrix that includes eigenvalues $\lambda_a > \lambda_b > \ldots \lambda_k$ for a desired order of pages a, b, ..., k.

* * * * *